US006483848B1

(12) United States Patent
Miura et al.

(10) Patent No.: US 6,483,848 B1
(45) Date of Patent: Nov. 19, 2002

(54) METHOD FOR RECEIVING INFORMATION, APPARATUS FOR RECEIVING INFORMATION AND MEDIUM

(75) Inventors: Kouji Miura, Matsubara (JP); Takeshi Imanaka, Nara (JP); Hidemi Henmi, Otsu (JP); Satoshi Matsuura, Osaka (JP); Jun Ozawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/148,941

(22) Filed: Sep. 4, 1998

(30) Foreign Application Priority Data

Sep. 4, 1997 (JP) .......................................... 9-238786

(51) Int. Cl.[7] .............................. H04J 3/22; H04J 3/00
(52) U.S. Cl. ........................ 370/465; 370/498; 725/141
(58) Field of Search ................................ 370/465, 259, 370/352, 260, 230, 231, 522, 498, 330, 477, 478, 480; 379/201; 455/414, 13.4; 709/204; 707/4, 5; 704/1, 9, 8, 10; 725/40, 138, 139, 141; 348/14.08, 14.09, 14.13, 906

(56) References Cited

U.S. PATENT DOCUMENTS 5,784,380 A * 7/1998 Kuwahara .................. 370/509
5,850,265 A * 12/1998 Suh ............................ 348/553
6,037,995 A * 3/2000 Ichifuji et al. .............. 348/563
6,057,887 A * 5/2000 Imanaka et al. ............ 348/553

FOREIGN PATENT DOCUMENTS

JP 07143079 6/1995
JP 08263410 10/1996

* cited by examiner

*Primary Examiner*—Huy D. Vu
*Assistant Examiner*—Duc Ho
(74) *Attorney, Agent, or Firm*—RatnerPrestia

(57) ABSTRACT

A receiving apparatus includes an information receiving portion for receiving images, speech, text, data and the like, an additional information receiving portion for receiving additional information comprising a next key word indicating the contents of information scheduled for the next transmission, a received information synthesizing portion for synthesizing the information received by the information receiving portion and the additional information received by the additional information receiving portion and a display portion for displaying the information synthesized by the received information synthesizing portion. A user can look at the information displayed on the display portion along with the contents of the information scheduled for the next transmission.

5 Claims, 40 Drawing Sheets

Fig. 4 (A)

```
<HTML>
   <IMG SRC="next.jpg" ALT=" Next program is ">
   <H2> SMAP concert information </H2 >
</HTML >
```

nextProgram.htm

Fig. 4 (B)

```
<HTML>
<HEAD><TITLE > Johnny's World </TITLE></HEAD>
<BODY>


</BODY>
</HTML>
```

TOKIO.htm -> TOKIO_frame.htm

Fig. 4 (C)

```
<HTML>
<HEAD><TITLE > Johnny's World </TITLE></HEAD>
<FRAMESET ROWS="*, 50" >
  <FRAME SRC="TOKIO_frame.htm" >
  <FRAME SRC="nextProgram.htm" >
</FRAMESET>
</HTML>
```

TOKIO.htm

Fig. 11

| classification item | notice key word |
|---|---|
| Johnny's World | SMAP concert information |
| World Masterpiece Theater | Lost World |
| ⋮ | ⋮ |

Fig. 12 notice key word list

Johnny's World — SMAP concert information

World Masterpiece Theater — Lost World

| classification item | notice key word | expiration date |
|---|---|---|
| Johnny's World | SMAP concert information | 19970911 |
| World Masterpiece Theater | Lost World | 19970912 |
| ⋮ | ⋮ | |

Fig. 20

| classification item | reservation key word | received information |
|---|---|---|
| Johnny's World | SMAP concert information | ............ |
| World Masterpiece Theater | Lost World | ............ |
| ⋮ | ⋮ | |

Fig. 31

| reservation key word | transmission schedule | reception period |
| --- | --- | --- |
| SMAP concert information | 1998.03.31.12.00 | 00.30 |
| Lost World | 1998.03.31.15.00 | 02.30 |
| ⋮ | ⋮ | ⋮ |

Fig. 42

| reservation key word |
|---|
| Johnny's World |
| Johnny's World |
| Asian Travel |
| Asian Travel |
| Johnny's World |
| Johnny's World |
| World Masterpiece Theater |
| Johnny's World |

METHOD FOR RECEIVING INFORMATION, APPARATUS FOR RECEIVING INFORMATION AND MEDIUM

BACKGROUND OF THE INVENTION

1. Field of the Invention

The present invention relates to a method, apparatus for receiving information and medium which can be used, for example, for receiving information transmitted from an information transmitting apparatus or the like over a digital broadcasting system, a public switched telephone networks and the like.

2. Description of the Related Art

Information conventionally, information such as animation, still images, speech, characters and/or programs has been exchanged utilizing a public switched telephone network as in the case of the Internet or a personal computer communication. However, both of the Internet and the personal computer communication employ a method wherein a receiver of information accesses an information service provider (in short, ISP), and selects and acquires (downloads) required information from the storage apparatus at the ISP and wherein the receiver can not acquire any information without taking any action on the ISP. That is, information can not be acquired through simple operations like selecting a channel as in the case of a common television broadcast. Such an information communication system involving operations at the end of a receiver can not be used as information communication means for advertising and public announcement.

In order to solve such a problem with multi-media information communication, information communication systems have recently been proposed wherein an ISP accesses a multiplicity of receivers for whom the information is intended over a public switched telephone network to send the information to the receivers and to accumulate it at the receivers' sides whether or not the receivers (homes) need the information and wherein each receiver selects displaying operations on the data storage apparatus (data receiving apparatus) to display necessary information on a screen through operations similar to, for example, those for selecting a television broadcast channel.

As a result of the progress of digital techniques, research and development are under way in the broadcasting industry toward digital broadcasting systems in which various kinds of information including broadcast signals are digitized. Known systems of such a type include integrated services digital broadcasting (ISDB) systems. In an ISDB system, multi-media information is digitized and is transmitted in an integrated and multiplexed form. When various kinds of information are integrated and multiplexed, additional information to be used as control information at the receivers' sides can be simultaneously transmitted in addition to such information.

Therefore, the use of the system as described above will make it possible to realize services to transmit various kinds of information such as news, sports news, weather forecasts, leisure information and program-related information.

However, the above-described configuration results in a problem in that a user can not efficiently find desired information by looking up the information on a receiving apparatus when the communication capacity of the public switched telephone network increases and when an enormous amount of information is transmitted utilizing means such as digital broadcasting that inherently employs a wide band. Meanwhile, an ISP adds a key word to information to be transmitted or transmits transmission schedules in advance to satisfy a need to allow users to look at the information continually. Japanese Patent Application Laid-Open (JPA) No. 8-263410 has proposed a method in which a receiver specifies a key word for required information and selects the information by collating the key word which has been added to received information with the specified key word. However, using the received key word alone leaves a problem in that a receiver will be reluctant to look at information other than the specified information and will therefore have less opportunity to discover new information and in that a provider can not expect an increase in the number of users.

Meanwhile, increase in the power consumption of receiving terminals has recently become a problem and users have an increasing need for suppressing the power consumption of their receiving apparatuses during transmission of information unnecessary for them. Conventional receiving apparatuses have had a problem in that such an increase in power consumption can not be suppressed.

SUMMARY OF THE INVENTION

The present invention addresses the above-described problem with the conventional art, and it is an object of the invention to provide a method, apparatus for receiving information and medium in which the contents of information scheduled to be transmitted with a time delay can be obtained from an amount of information less than that required for the same purpose in the conventional art.

Taking the above-described problems with the conventional art into consideration, it is another object of the invention to provide a method, apparatus for receiving information and medium which allow power consumption to be suppressed compared to the conventional art.

The first aspect of the present invention is a method for receiving information comprising the steps of:

receiving transmitted first contents information including at least any of images, speech, text and data;

receiving notice information transmitted prior to second contents information and associated with said second contents information, said second contents information being scheduled to be transmitted at a time delay from the transmission of said first contents information and having contents related to the contents of said first contents information; and displaying said received contents information and said notice information substantially simultaneously in a synthesized manner or side by side.

The second aspect of the present invention is an apparatus for receiving information comprising:

first receiving means for receiving transmitted first contents information including at least any of images, speech, text and data;

second receiving means for receiving notice information transmitted prior to second contents information and associated with said second contents information, said second contents information being scheduled to be transmitted at a time delay from the transmission of said first contents information and having contents related to the contents of said first contents information; and received information processing and displaying means for displaying said received contents information and said notice information substantially simultaneously in a synthesized manner or side by side.

The third aspect of the present invention is a method for receiving information comprising the steps of:

receiving transmitted first contents information including at least any of images, speech, text and data in a state where, said first contents information includes notice information associated with second contents information which is scheduled to be transmitted at a time delay from the transmission of said first contents information and which has contents related to the contents of said first contents information;

separating said notice information from said received information;

reconstructing said separated notice information and said first contents information; and displaying said reconstructed information.

The fourth aspect of the present invention is an apparatus for receiving information comprising:

information receiving means for receiving transmitted first contents information including at least any of images, speech, text and data in a state where, said first contents information includes notice information associated with second contents information which is scheduled to be transmitted at a time delay from the transmission of said first contents information and which has contents related to the contents of said first contents information;

information separating means for separating said notice information from said received information;

information reconstructing means for reconstructing said separated notice information and said first contents information; and display means for displaying said reconstructed information.

The fifth aspect of the present invention if a method for receiving information, comprising the steps of:

transmitting relationship information indicating relationship between said first contents information and said notice information; and receiving said transmitted relationship information.

The sixth aspect of the present invention is an apparatus for receiving information, wherein:

said receiving means receives relationship information transmitted thereto indicating relationship between said first contents information and said notice information.

The seventh aspect of the present invention is a method for receiving information, wherein:

said notice information is a notice key word;

said received notice key word is stored; and said notice key word is displayed upon an instruction that said stored notice key word is to be read.

The eighth aspect of the present invention is an apparatus for receiving information, wherein:

said notice information is a notice key word;

said apparatus comprises additional information storing means for storing said received notice key word; and said received information processing and displaying means displays said notice key word upon an instruction that said stored notice key word is to be read.

The ninth aspect of the present invention is a method for receiving information, said information including notice key words for information scheduled to be transmitted at a time delay and the scheduled dates and times for said scheduled information transmitted as the expiration dates of said notice key words, said method comprising the steps of:

receiving said notice key words;

storing said received notice key words;

acquiring the current point in time;

comparing the current point in time with the expiration date of each of said stored notice key words;

deleting each notice key word whose expiration date has been determined expired as a result of the comparison from said stored notice key words; and displaying notices for the reception of said information transmitted at a time delay based on said stored notice key words.

The tenth aspect of the present invention is an apparatus for receiving information, comprising:

additional information receiving means for receiving notice key words for information scheduled to be transmitted at a time delay from transmitted information including said notice key words and the scheduled dates and times for said scheduled information transmitted as the expiration dates of said notice key words;

additional information storing means for storing said received notice key words;

current time acquiring means for acquiring the current point in time;

expiration date comparing means for comparing the current point in time acquired by said current time acquiring means with the expiration date of each of said stored notice key words;

additional information deleting means for deleting each notice key word whose expiration date has been determined expired by said expiration date comparing means from said stored notice key words; and related information display means for displaying notices for the reception of said information transmitted at a time delay based on said notice key words stored in said additional information storing means.

The eleventh aspect of the present invention is a method for receiving information, wherein contents information including at least any of images, speech, text and data is transmitted along with a key word representing the contents of said contents information as a content key word and along with a key word for related information scheduled to be transmitted at a time delay as a notice key word, said method comprising the steps of:

receiving said contents information;

receiving said content key word and said notice key word;

displaying said notice key word and accepting designation of said displayed notice key word by a user for reservation of received information;

storing said notice key word designated for reservation;

comparing said stored notice key word and a newly received content key word; and selecting and storing contents information received based on the result of the comparison.

The twelfth aspect of the present invention is an apparatus for receiving information, wherein contents information including at least any of images, speech, text and data is transmitted along with a key word representing the contents of said contents information as a content key word and along with a key word for related information scheduled to be transmitted at a time delay as a notice key word, said apparatus comprising:

information receiving means for receiving said contents information;

additional key word receiving means for receiving said content key word and said notice key word;

notice key word display means for displaying said notice key word;

reservation designating means for allowing a user to designate received information to be reserved based on said displayed notice key word;

reservation key word storing means for storing said notice key word designated for reservation by said reservation designating means;

key word comparing means for comparing said notice key word stored in said reservation key word storing means and a content key word newly received by said additional key word receiving means; and information storing means for selecting and storing contents information received by said information receiving means based on the result of the comparison.

The thirteenth aspect of the present invention is a method for receiving information according to said seventh invention, comprising the step of:

forming indices for received information on a hierarchical basis by using both of key words representing classification items for classifying said contents information and key words representing the details of said items among said notice key words.

The fourteenth aspect of the present invention is an apparatus for receiving information, comprising:

reservation information creating means for forming indices for received information on a hierarchical basis by using both of key words representing classification items for classifying said contents information and key words representing the details of said items among said notice key words. The fifteenth aspect of the present invention is a method for receiving information, comprising the steps of:

displaying said indices for said stored information;

accepting a selection from among said indices; and displaying the stored contents information using said selected indices.

The sixteenth aspect of the present invention is an apparatus for receiving information, comprising:

index display means for displaying said indices for said stored information on said displaying means;

index selecting means for making a selection from among said indices; and reserved information display means for displaying information stored in said reserved information storing means on said display means using said selected indices.

The seventeenth aspect of the present invention is a method for receiving information, wherein contents information including at least any of images, speech, text and data is transmitted along with a key word representing the contents of related information scheduled to be transmitted at a time delay as a notice key word and along with the arrival time of said related information and time required for receiving the same as a reception period, said method comprising the steps of:

receiving said contents information;

receiving said notice keyword and said reception period;

displaying said notice key word;

accepting designation of said displayed notice key word by a user for reservation of received information; and receiving and storing contents information based on said reception period received along with said notice key word designated for reservation.

The eighteenth aspect of the present invention is an apparatus for receiving information, wherein contents information including at least any of images, speech, text and data is transmitted along with a key word representing the contents of related information scheduled to be transmitted at a time delay as a notice key word and along with the arrival time of said related information and time required for receiving the same as a reception period, said apparatus comprising:

information receiving means for receiving said contents information;

additional information receiving means for receiving said notice key word and said reception period;

reception period receiving means for receiving said reception period;

notice key word display means for displaying said notice key word; and reservation designating means for allowing a user to designate received information based on said displayed notice key word, wherein contents information is selected and stored based on said reception period received by said reception period receiving means along with said notice key word designated for reservation by said reservation designating means.

The nineteenth aspect of the present invention is an apparatus for receiving information, wherein contents information including at least any of images, speech, text and data is transmitted along with a key word representing the contents of related information scheduled to be transmitted at a time delay as a notice key word and along with the arrival time of said related information and time required for receiving the same as a reception period, said apparatus comprising:

information receiving means for receiving said contents information;

additional information receiving means for receiving said notice key word and said reception period;

reception period receiving means for receiving said reception period;

power supply means for controlling the supply of power to at least one means including at least said information receiving means;

current time acquiring means for outputting the current time;

notice key word display means for displaying said notice key word; and reservation designating means for allowing a user to designate received information based on said displayed notice key word, wherein said power supply means is controlled to select and store contents information received by said receiving means based on notice key word designated for reservation by said reservation designating means along with the reception period received by said reception period receiving means and the current time output by said current time acquiring means.

The twentieth invention of the present invention is a method for receiving information according to said seventeenth invention, wherein said reception period includes the arrival time of information and the time at which reception is terminated.

The twenty-first invention of the present invention is an apparatus for receiving information according to said eighteenth or said nineteenth invention, wherein said reception period includes the arrival time of information and the time at which reception is terminated.

The twenty-second invention of the present invention is a method for receiving information, wherein contents information including at least any of images, speech, text and data is transmitted along with a key word for related information scheduled to be transmitted at a time delay as a notice key word, said method comprising the steps of:

receiving said contents information;

receiving said notice key word; and displaying said contents information and said notice key word.

The twenty-third aspect of the present invention is an apparatus for receiving information, wherein contents information including at least any of images, speech, text and data is transmitted along with a key word for related information scheduled to be transmitted at a time delay as a notice key word, said apparatus comprising:

information receiving means for receiving said contents information;

additional information receiving means for receiving said notice key word; and display means for displaying said contents information and said notice key word.

The twenty-fourth aspect of the present invention is a method for receiving information, comprising the step of:

after receiving transmission of information in which said contents information and said notice key word are associated with each other in advance and those pieces of information are transmitted as separate pieces of information at different times, adding said notice key word to said contents information based on said association.

The twenty-fifth aspect of the present invention is an apparatus for receiving information, wherein after receiving transmission of information in which said contents information and said notice key word are associated with each other in advance and those pieces of information are transmitted as separate pieces of information at different times, said notice key word is added to said contents information based on said association.

The twenty-sixth aspect of the present invention is a method for receiving information, comprising the step of:

after receiving transmission of information in which said contents information, said notice key word and said content key word are associated with each other in advance and those pieces of information are transmitted as separate pieces of information at different times, adding said notice key word and said content key word to said contents information based on said association.

The twenty-seventh aspect of the present invention is an apparatus for receiving information, wherein after receiving transmission of information in which said contents information, said notice key word and said content key word are associated with each other in advance and those pieces of information are transmitted as separate pieces of information at different times, said notice key word and said content key word are added to said contents information based on said association.

The twenty-eighth aspect of the present invention is a method for receiving information, comprising the step of:

after receiving transmission of information in which said notice key word and the expiration date of said notice key word are associated with each other in advance and those pieces of information are transmitted as separate pieces of information at different times, adding said expiration date to said notice key based on said association.

The twenty-ninth aspect of the present invention is an apparatus for receiving information, wherein after receiving transmission of information in which said notice key word and the expiration date of said notice key word are associated with each other in advance and those pieces of information are transmitted as separate pieces of information at different times, said expiration date is added to said notice key word based on said association.

The thirtieth aspect of the present invention is a method for receiving information, comprising the step of:

after receiving transmission of information in which said contents information, said notice key word and said expiration date are associated with each other in advance and those pieces of information are transmitted as separate pieces of information at different times, adding said contents information, said notice key word and said expiration date based on said association.

The thirty-first aspect of the present invention is an apparatus for receiving information, wherein after receiving transmission of information in which said contents information, said notice key word and said expiration date are associated with each other in advance and those pieces of information are transmitted as separate pieces of information at different times, said contents information, said notice key word and said expiration date are added based on said association.

The thirty-second aspect of the present invention is a method for receiving information, for the transmission of contents information including at least any of images, speech, text and data wherein at least one particular contents information periodically transmitted for a predetermined time is added with a key word for related information scheduled to be transmitted at a time delay as a notice key word and added with the time required for receiving said related information as a reception period, said method comprising the steps of:

receiving said contents information;

receiving said notice key word and said reception period;

displaying said notice key word;

accepting designation of said displayed notice key word by a user for reservation of received information; and receiving and said contents information based on said reception period received along with said notice key word designated for reservation.

The thirty-third aspect of the present invention is an apparatus for receiving information, wherein contents information including at least any of images, speech, text and data is transmitted such that at least one piece of said contents information periodically transmitted for a predetermined time is added with a key word for related information scheduled to be transmitted at a time delay as a notice key word and added with the time required for receiving said related information as a reception period, said apparatus comprising:

information receiving means for receiving said contents information;

additional information receiving means for receiving said notice key word;

reception period receiving means for receiving said reception period;

power supply means for controlling the supply of power to one or more means including at least said information receiving means;

synchronous power supply control means for controlling said power supply means in synchronism with time at which said particular contents information is transmitted;

current time acquiring means for outputting the current time;

notice key word display means for displaying said notice key word; and reservation designating means for allowing a user to designate received information based on said displayed notice key word, wherein said power supply means is controlled to select and store said contents information received by said receiving means based on said reception period received by said reception period receiving means along with said notice key word designated for reservation by said reservation designating means and the current time output by said current time acquiring means.

The thirty-fourth aspect of the present invention is method for receiving information, wherein said reception period includes the arrival time of information and the time at which reception is terminated.

The thirty-fifth aspect of the present invention is an apparatus for receiving information, wherein said reception period includes the arrival time of information and the time at which reception is terminated.

The thirty-sixth aspect of the present invention is a method for receiving information, comprising the step of:

forming indices for received information on a hierarchical basis by using both of key words representing classification items for classifying said contents information and key words representing the details of said items among said notice key words.

The thirty-seventh aspect of the present invention is an apparatus for receiving information, comprising:

reservation information creating means for forming indices for received information on a hierarchical basis by using both of key words representing classification items for classifying said contents information and key words representing the details of said items among said notice key words.

The thirty-eighth aspect of the present invention is a method for receiving information comprising the steps of:

storing key words representing classification items for classifying said contents information from among notice key words which have already been designated for reservation;

calculating the frequencies of said stored classification items; and selecting the order of display for said notice key words based on the calculated frequencies of the classification items and displaying the same.

The thirty-ninth aspect of the present invention is an apparatus for receiving information, comprising:

reserved classification item storing means for storing key words representing classification items for classifying said contents information from among notice key words which have already been designated for reservation;

frequency calculating means for calculating the frequencies of said stored classification items; and notice key word display order selecting means for selecting the order of display for said notice key words based on the calculated frequencies of the classification items; and display means for displaying said notice key words in said order of display.

The fortieth aspect of the present invention is a method for receiving information, comprising the steps of:

storing key words representing classification items for classifying said contents information from among notice key words which have already been designated for reservation;

calculating the frequencies of said stored classification items; and selecting and displaying at least one candidate of contents information to be deleted based on at least either of said calculated frequencies of the classification items and the date and time when the contents information has been stored.

The forty-first aspect of the present invention is an apparatus for receiving information, comprising:

reserved classification item storing means for storing key words representing classification items for classifying said contents information from among notice key words which have already been designated for reservation;

frequency calculating means for calculating the frequencies of said stored classification items; and contents information storage date and time storing means for storing the date and time when said contents information has been stored;

delete candidate selecting means for selecting at least one candidate of contents information to be deleted based on at least either of said calculated frequencies of the classification items and the date and time when the contents information has been stored; and display means for displaying the contents information selected by said delete candidate selecting means.

The forty-second aspect of the present invention is a method for receiving information, comprising the steps of:

determining that the storage of said contents information designated for reservation has been completed; and displaying a message indicating that the storage of reserved information has been completed.

The forty-third aspect of the present invention is an apparatus for receiving information, comprising:

reserved information storage completion determining means for determining that the storage of said contents information designated for reservation has been completed; and message display means for displaying a message indicating that the storage of reserved information has been completed.

The forty-fourth aspect of the present invention is a method for receiving information, comprising the steps of:

determining that the storage of said contents information designated for reservation has been completed; and replying information indicating that the storage of reserved information has been completed to the transmitter of said contents information.

The forty-fifth aspect of the present invention is an apparatus for receiving information, comprising:

reserved information storage completion determining means for determining that the storage of said contents information designated for reservation has been completed; and information replying means for replying information indicating that the storage of reserved information has been completed to the transmitter of said contents information.

The forty-sixth aspect of the present invention is a method for receiving information, comprising the steps of:

determining that the storage of said contents information designated for reservation has been completed;

storing the content key word for said stored contents information; and periodically replying said stored content key word to the transmitter of said contents information.

The forty-seventh aspect of the present invention is an apparatus for receiving information, comprising:

reserved information storage completion determining means for determining that the storage of said contents information designated for reservation has been completed;

stored contents information storing means for storing the content key word for said stored contents information; and information replying means for periodically replying said stored content key word stored in said stored contents information storing means to the transmitter of said contents information.

The forty-eighth aspect of the present invention is a medium for recording a program to cause a computer to execute all or part of each means or portions invention.

BRIEF DESCRIPTION OF THE DRAWINGS

FIGS. 4A, 4B and 4C are views of synthesized information according to the first embodiment of the invention;

FIG. 11 is a diagram showing an example of data stored in an additional information database according to the third embodiment of the invention;

FIG. 12 is a view of an example of display according to the third embodiment of the invention;

FIG. 15 is a diagram showing an example of data stored in an additional information database according to the fourth embodiment of the invention;

FIG. 20 is a diagram showing an example of data stored in a reservation information database according to the sixth embodiment of the invention;

FIG. 31 is a diagram showing an example of data stored in an additional information database according to the tenth embodiment of the invention;

FIG. 42 is a view of an example of a reservation classification item database according to the eleventh embodiment of the invention.

DESCRIPTION OF THE REFERENCE NUMERALS

Figure 1:
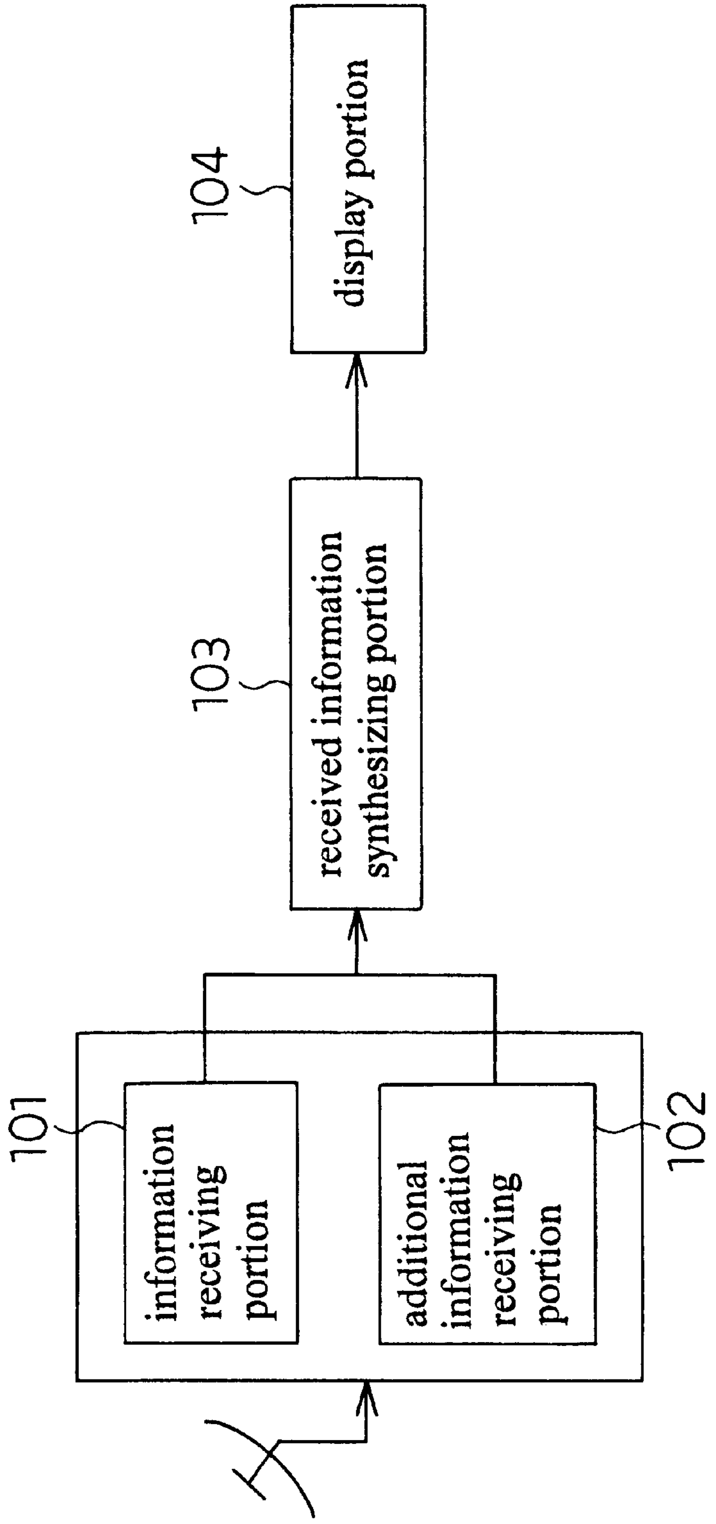
FIG. 1 is a system configuration diagram for a first embodiment of the invention.

101 information receiving portion
102 additional information receiving portion
103 received information synthesizing portion
104 display portion
106 information receiving portion
602 information separating portion
901 additional information database
1301 additional information database
1302 clock
1303 expiration date comparing portion
1304 additional information deleting portion
1601 key input portion
1602 reservation key word database
1603 key word comparing portion
1604 reserved information database
1801 index creating portion
2101 index display portion
2102 index selecting portion

2103 reserved information display portion
2401 clock
2402 power supply control portion
2403 reception period receiving portion
2601 clock
2602 power supply control portion
2603 reception period receiving portion
2901 synchronous power supply control means
3201 reserved classification item database
3202 frequency calculating portion
3203 notice key word display selecting portion
3204 display portion
3401 contents information storage date and time database
3402 delete candidate selecting portion
3403 display portion
3601 reserved information storage completion determining portion
3602 display portion
3801 reserved information storage completion determining portion
3802 information replying portion
4001 reserved information storage completion determining portion
4002 stored contents information database
4003 information replying portion

DESCRIPTION OF THE PREFERRED EMBODIMENTS

Preferred embodiments of the present invention will now be described with reference to the accompanying drawings.

A first embodiment will be described.

An information transmitting apparatus utilizing satellite digital broadcasting will now be described as an embodiment of the present invention.

FIG. 1 is a system configuration diagram according to the first embodiment of the invention.

FIG. 1, a reference numeral 101 designates an information receiving portion for receiving contents information such as images, speech, text and data; a reference numeral 102 designates an additional information receiving portion for receiving notice key words; a reference numeral 103 designates a received information synthesizing portion for synthesizing contents information which has been received by the information receiving portion 101 and notice key words which have been received by the additional information receiving portion 102; and a reference numeral 104 designates a display portion for displaying information which has been synthesized by the received information synthesizing portion 103.

In FIG. 1, the information receiving portion 101 and the additional information receiving portion 102 are both means for receiving satellite broadcasts. Therefore, the present embodiment assumes that contents information and notice key word information are broadcasted over different broadcast channels. Obviously, an alternative configuration may be employed in which one kind of information is sent over a satellite broadcast and the other kind of information is sent over a public switched telephone network.

The information receiving portion 101 and the additional information receiving portion 102 respectively correspond to the first and the second receiving means in the context of the present invention. Means for processing and displaying received information in the context of the present invention is means including the received information synthesizing portion 103 and the display portion 104. While the notice key words are an exemplum of notice information according to the invention, such key words are not limited to key words in a limited sense of word consisting of a string of characters and may include information other than characters, e.g., information constituted by numerals, illustrations, graphics, colored characters, numerals and graphics and speech and information which is a combination of them.

Figure 28:
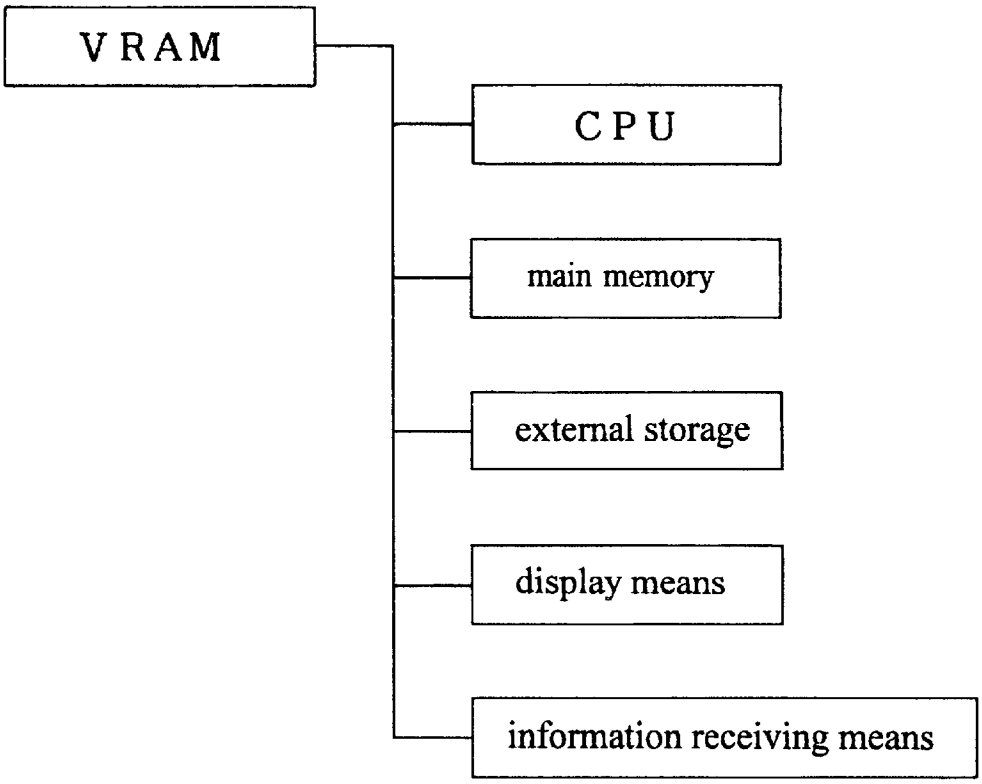
FIG. 28 is a hardware configuration diagram for the first embodiment of the invention.

FIG. 28 shows a hardware configuration of the present embodiment. The configuration shown in FIG. 28 is basically similar to the configuration of a general purpose computer system except that it is added with reception means for receiving satellite digital broadcasting.

Figure 2:
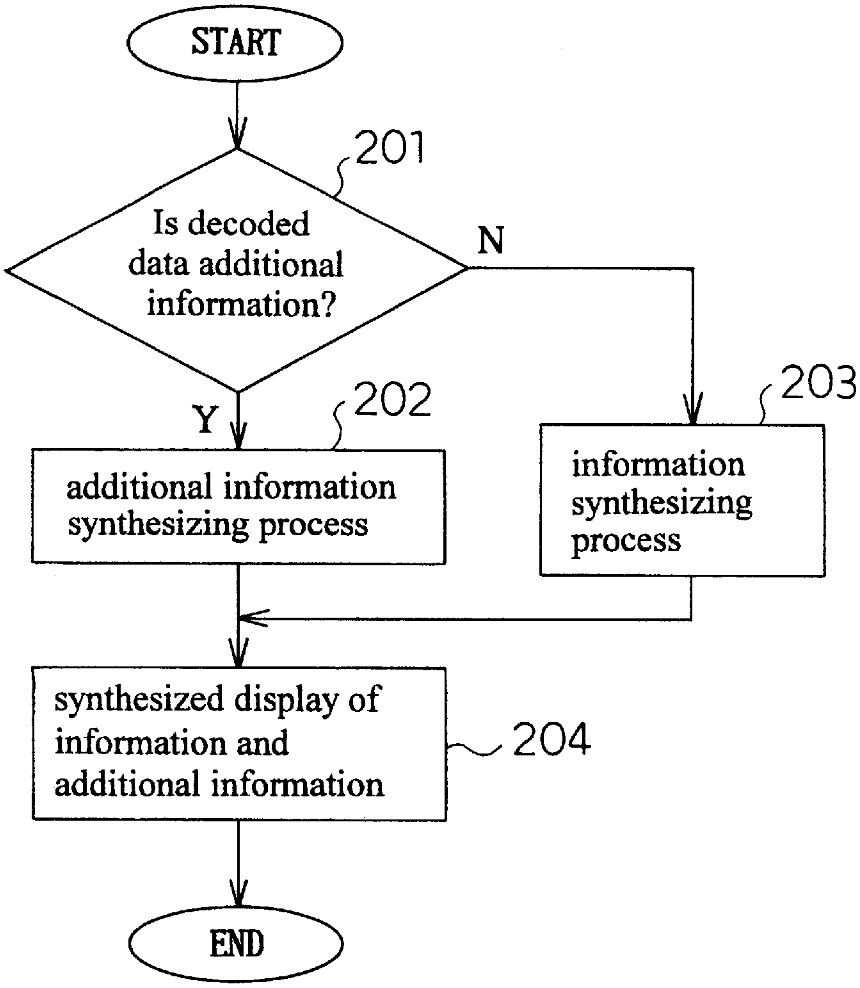
FIG. 2 is a flow chart showing an operational procedure of the first embodiment of the invention.

The operation of the information receiving apparatus having the above-described configuration will now be described with reference to the flow chart in FIG. 2.

At step 201, reception data is decoded. A stream of a satellite wave received by a receiving antenna is assembled into packets, and a plurality of packets are reconstructed into a data unit (e.g., a file or a program). After the decoding, an identifier which has been added to the data is determined. If it is a notice key word, the process proceeds to step 202 and, if it is contents information, the process proceeds to step 203. The determination of the identifier is carried out in both of the information receiving portion 101 and the additional information receiving portion 102. The reason is that either of the channels may have various kinds of multiplexed data and needs to determine the identifier after the packets have been assembled. For example, multiplexed data may comprise a notice from a broadcasting station and data for another service such as karaoke.

Figure 3:
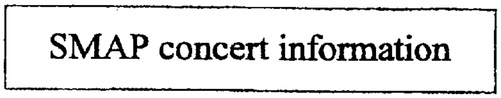
FIG. 3 is a view of an example of a notice key word according to the first embodiment of the invention.

At step 202, the received information synthesizing portion 103 performs a process of displaying the notice key word on the display portion simultaneously with received information. In the present embodiment, it is assumed that the received information is described in the HTML (hyper text markup language) and is accessed using a dedicated browser. The received notice key word is shown in FIG. 3. In this case, an HTML file as shown in FIG. 4A is created from the notice key word, and a file to serve as a basis for future synthesis is created as shown in FIG. 4C.

At step 203, the received information synthesizing portion 103 performs a process of displaying the contents information on the display portion simultaneously with the notice key word. In order to synthesize them with the base file prepared at step 202, a file name change is carried out as shown in FIG. 4B.

Figure 5:
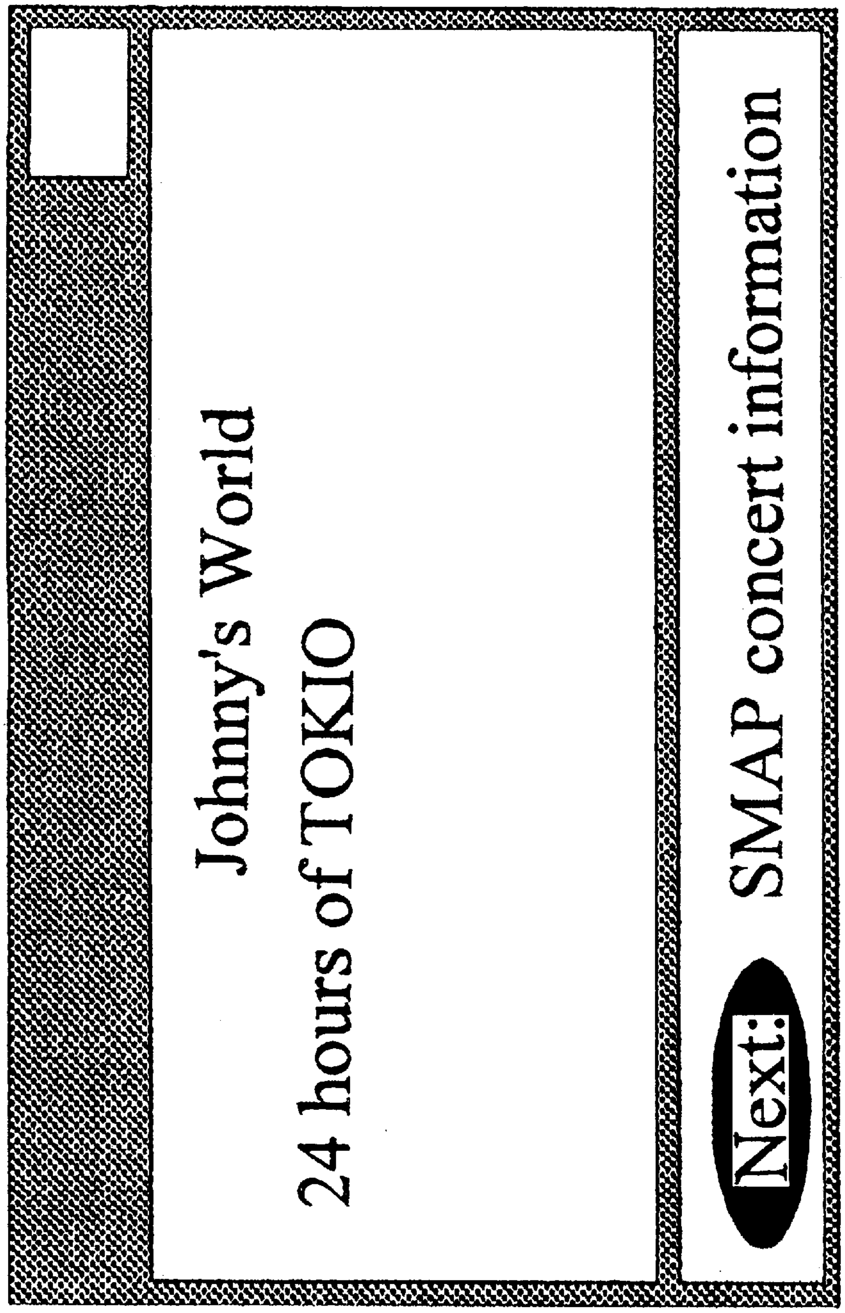
FIG. 5 is a view of an example of display according to the first embodiment of the invention.

At step 204, the display portion 104 displays the contents information and the notice key word. The information is accessed using an HTML browser. Since the contents information and the notice key word are synthesized at steps 202 and 203 to be displayed simultaneously using an HTML frame tag, a user can look at the notice key word simultaneously with the contents information by displaying the base file shown in FIG. 4C. An example of such display is shown in FIG. 5. In the FIGS. 3, 4 and 5, "SMAP" and "TOKIO" are groups of Japanese young singers, respectively, and "Johnny's World" is a program name.

As described above, a user can check the contents of information scheduled in the next transmission when he/she reads the received information.

Although satellite digital broadcasting is used as communication means in the first embodiment, a public switched telephone network, CATV network or surface wave broadcasting may be used instead. The information receiving portion and the additional information receiving portion may use different means for communication. The information receiving portion and the additional information receiving portion may be provided as a single means insteads of being separated from each other.

While the contents information and the notice key word information were described as being displayed in a synthesized form, those items of information may be simply displayed side by side on the display without being synthesized with each other.

In the present embodiment, relationship information must be sent by the broadcasting station in advance to show the relationship between first contents information and the notice information. For example, when plural kinds of contents information are broadcasted over a plurality of channels, a receiving apparatus can not know which channel is broadcasting the notice information having contents associated with the contents of each contents information without such relationship information. This equally applies to embodiments to be described later. Further, this relationship information may be sent independently or may be added to either contents information or notice information.

A second embodiment of the invention will now be described.

An information receiving apparatus utilizing satellite digital broadcasting will now be described as an embodiment of the invention.

Figure 6:
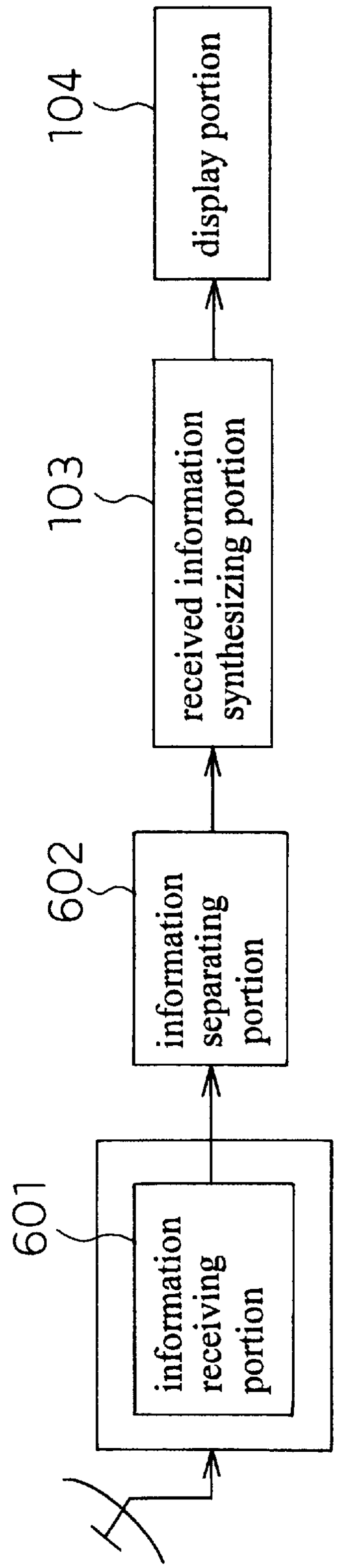
FIG. 6 is a system configuration diagram for a second embodiment of the invention.

FIG. 6 is a system configuration diagram according to the present embodiment. FIG. 6 includes the same parts as those in the system configuration for the first embodiment shown in FIG. 1. The following description will omit such parts which are indicated by like reference numbers and will be focused on only different parts.

In FIG. 6, a reference numeral 601 designates an information receiving portion for receiving contents information such as images, speech, text and data including a notice key word which indicates the contents of the information scheduled for the next transmission and a reference numeral 602 designates an information separating portion for separating the notice key word in the contents information which has been received by the information receiving portion 601 from received information.

The information receiving portion 601 and the information separating portion 602 correspond to the information receiving means and the information separating means in the context of the invention.

Figure 7:
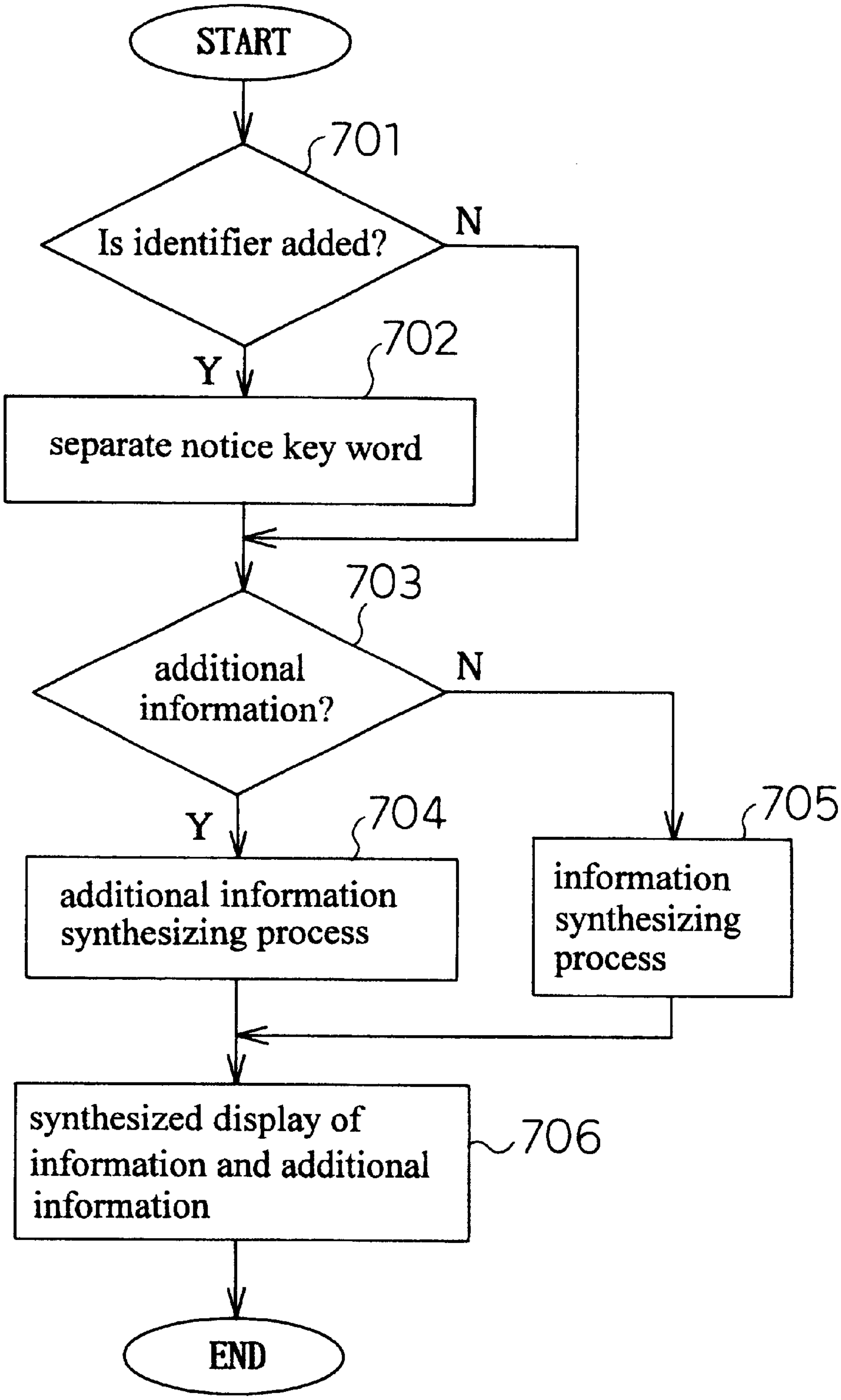
FIG. 7 is a flow chart showing an operational procedure of the second embodiment of the invention.

The operation of the information receiving apparatus having the above-described configuration will now be described with reference to the flow chart in FIG. 7.

At step 701, reception data is decoded. A stream of a satellite wave received by a receiving antenna is assembled into packets, and a plurality of packets are reconstructed into a data unit (e.g., a file or a program). The reconstructed data does not necessarily include a notice key word. For example, when the information consists of text, images and speech, the addition of a notice key word to each of such elements results in the waste of the communication capacity. Therefore, a notice key word is added only to representative elements. Whether a notice key word is added or not is determined from an identifier. If added, the process proceeds to step 702 and, if not, the process proceeds to step 705.

Figure 8:
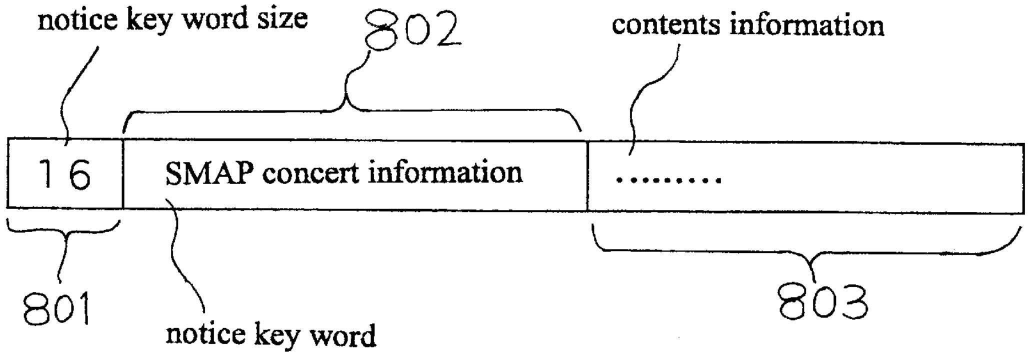
FIG. 8 is a diagram of an example of data according to the second embodiment of the invention.

At step 702, notice key words in contents information are separated from the received information. In a piece of information including a notice key word, a notice key word size and the key word are consecutively added in a predetermined area therein. For example, when there is a rule that a notice key word is to be added at the beginning of the received information, a specified size is read from the beginning to know the size of the notice key word. Thereafter, data is read out at the read position in an amount corresponding to the size of the read notice key word to separate the notice key word. An example of the configuration of the data is shown in FIG. 8. In FIG. 8, an area for storing the information of the notice key word size is indicated by a reference number 801, an area for storing the notice key word is indicated by a reference number 802, and an area for storing the contents information is indicated by a reference number 803. An HTML file or an AV data stream is stored in the area 803 as contents information.

Steps 703 through 706 perform the same processes as those in steps 201 through 204 of the first embodiment of the invention.

As described above, a user can check the contents of the information scheduled for the next transmission when he/she reads the received information.

Although the satellite digital broadcasting is used as communication means in the second embodiment, a public switched telephone network, CATV network or surface wave broadcasting may be used instead.

While the contents information and the notice key word information were described as being displayed in a synthesized form, those items of information may be simply displayed side by side on the display without being synthesized with each other.

A third embodiment of the invention will now be described.

An information receiving apparatus utilizing satellite digital broadcasting will now be described as an embodiment of the invention.

Figure 9:
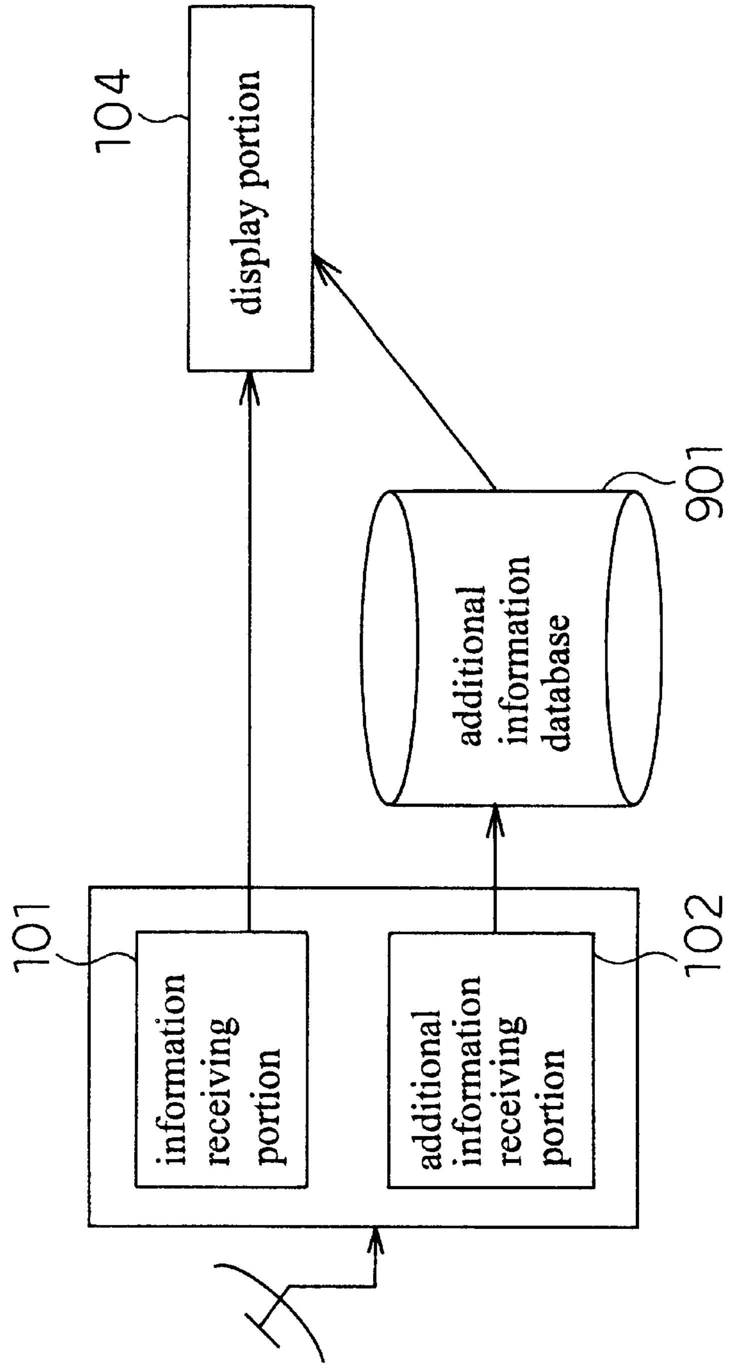
FIG. 9 is a system configuration diagram for a third embodiment of the invention.

FIG. 9 is a system configuration diagram according to the third embodiment of the invention. FIG. 9 includes the same parts as those in the system configuration for the first embodiment shown in FIG. 1. The following description will omit such parts which are indicated by like reference numbers and will be focused on only different parts.

In FIG. 9, a reference numeral 901 designates an additional information database for storing a notice key word for each of classification items for classifying received information. The classification items are prepared in advance by the broadcasting station depending on the contents of the contents information transmitted and are sent as a part of additional information.

The additional information database 901 corresponds to the additional information storing means in the context of the present invention.

Figure 10:
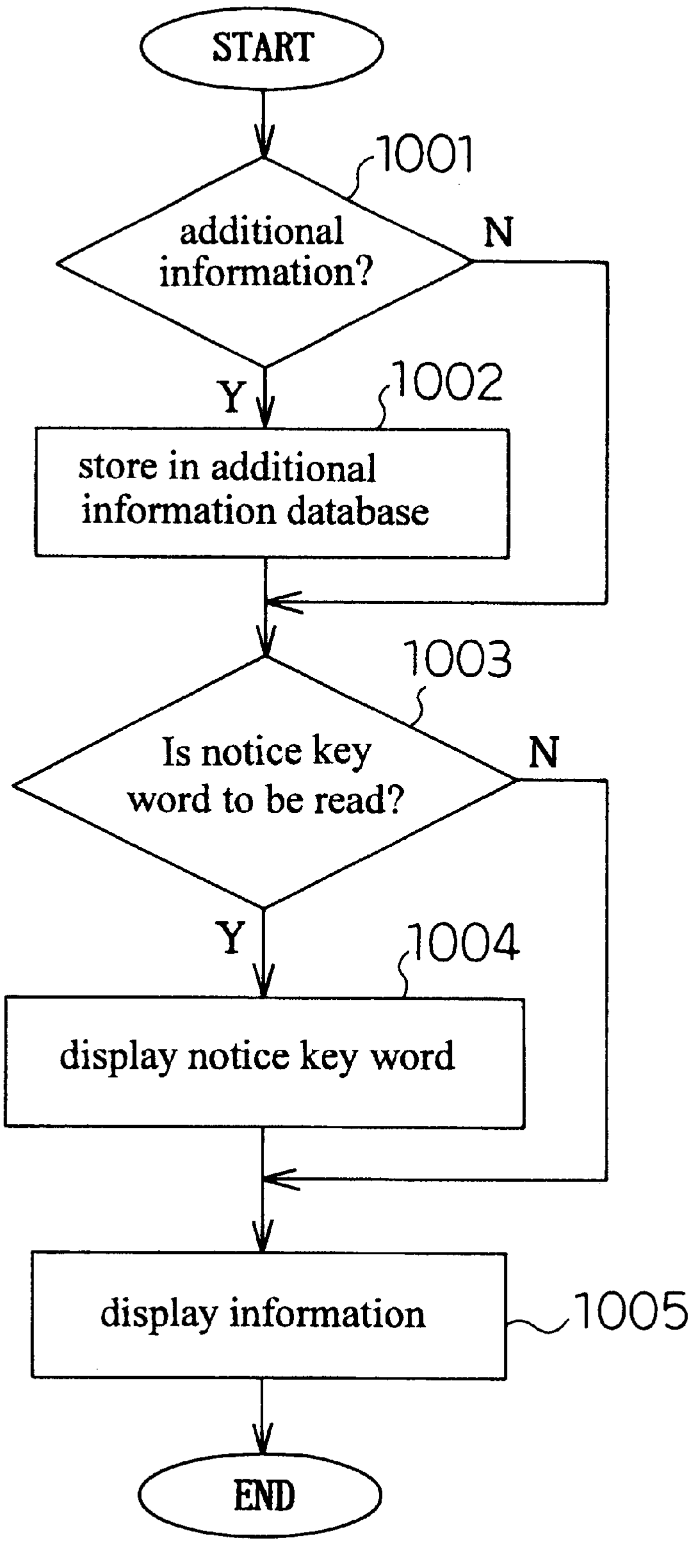
FIG. 10 is a flow chart showing an operational procedure of the third embodiment of the invention.

The operation of the information receiving apparatus having the above-described configuration will now be described with reference to the flow chart in FIG. 10.

At step 1001, reception data is decoded. A stream of a satellite wave received by a receiving antenna is assembled into packets, and a plurality of packets are reconstructed into a data unit (e.g., a file or a program). The reconstructed data does not necessarily include a notice key word. After the decoding, an identifier added to the data is determined. If it is additional information, the process proceeds to step 1002 and, if it is contents information, the process proceeds to step 1003.

At step 1002, the received additional information is stored in the additional information database. The additional information consists of a classification item and a notice key word in a predetermined format. The classification item and the notice key word extracted according to the format are added to the additional information database. When a new notice key word for a previously received classification item is newly received, the notice key word is overwritten. The classification items and notice key words are stored in the additional information database in a table format as shown in FIG. 11.

It is determined at step 1003 whether the notice keywords are to be accessed or not. If a user wishes to access the notice key words, the process proceeds to step 1004 and, if not, the process proceeds to step 1005. A user can instruct his/her wish to look at notice key words using a key on a remote controller or a GUI (graphical user interface) on the screen. That is, the determination whether the notice key words are to be looked at is made through a user interface. In this case, a user selects a menu on the display using the remote controller as described above. Therefore, the display portion 104 has the function of interfacing with an user and allowing the user to look at the notice key words.

At step 1004, the notice key words are displayed. The display portion 104 displays all information concerning the notice key words for all classification items stored in the additional information database 901. An example of the display is shown in FIG. 12.

At step 1005, contents information is displayed. The present embodiment is on an assumption that the information is written in the HTML. The information is looked at using an HTML browser.

As described above, a user can check the contents of the information for each classification item scheduled to be transmitted next.

Although satellite digital broadcasting is used as communication means in the third embodiment, a public switched telephone network, CATV network or surface wave broadcasting may be used instead. The information receiving portion and the additional information receiving portion may use different means for communication. The information receiving portion and the additional information receiving portion may be provided as a single means instead of being separated from each other.

While the notice key words are stored and displayed in a hierarchical manner according to the classification items, such a hierarchical manner is not essential to the present invention.

A fourth embodiment of the invention will now be described.

An information receiving apparatus utilizing satellite digital broadcasting will now be described as an embodiment of the invention.

Figure 13:
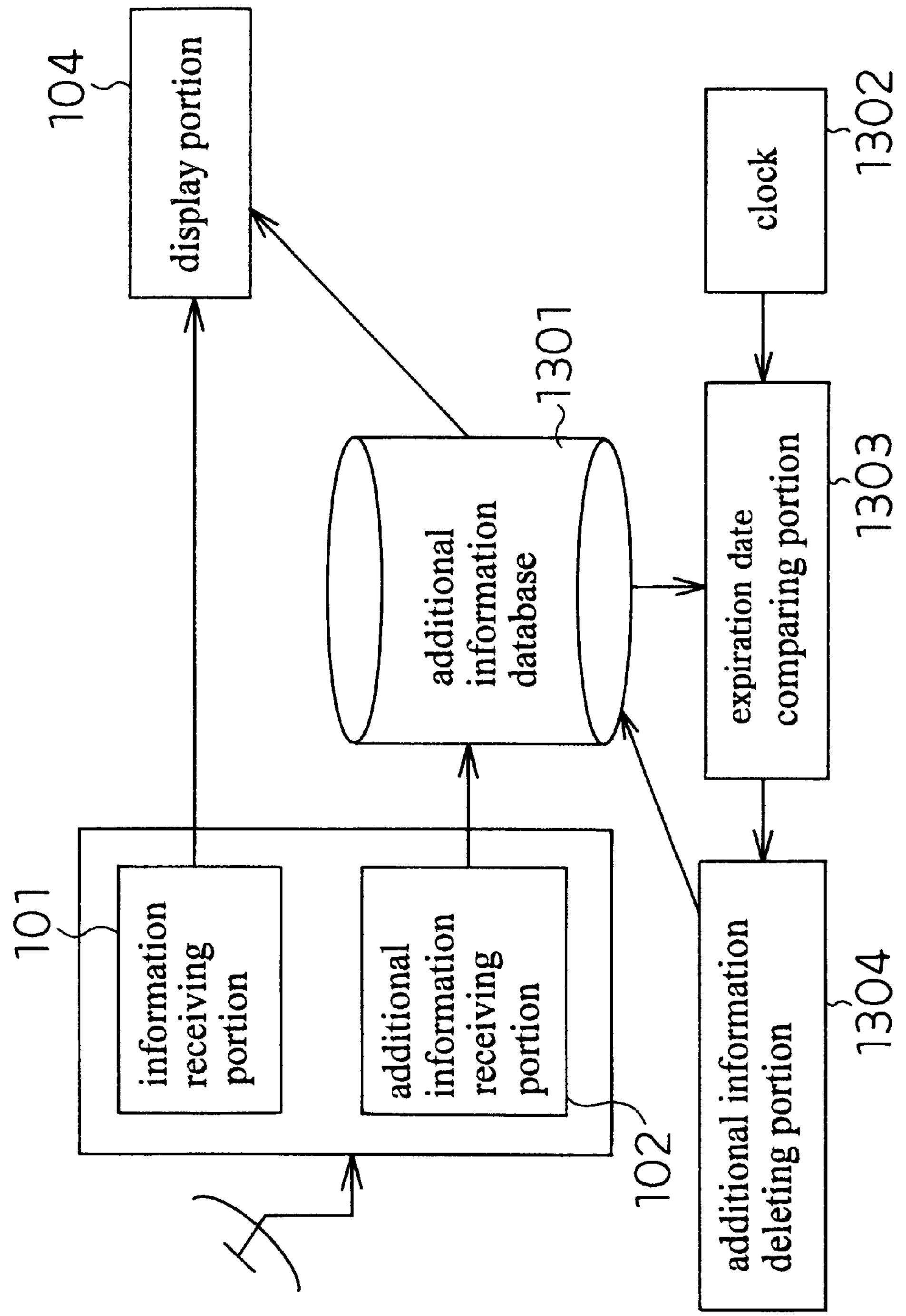
FIG. 13 is a system configuration diagram for a fourth of the invention.

FIG. 13 is a system configuration diagram according to the present embodiment. FIG. 13 includes the same parts as those in the system configuration for the third embodiment shown in FIG. 9. The following description will omit such parts which are indicated by like reference numbers and will be focused on only different parts.

In FIG. 13, a reference numeral 1301 designates an additional information database for storing a notice key word for each of classification items to which received information belongs and the expiration date for the same; a reference numeral 1302 designates a clock that provides the current time; a reference numeral 1303 designates an expiration date comparing portion for comparing the current time provided by the clock 1302 with the expiration dates of the notice key words stored in the additional information database; and a reference numeral 1304 designates an additional information deleting portion for deleting notice key words whose expiration dates have expired as determined by the expiration date comparing portion 1303 from the additional information database.

In the above-described configuration, the additional information database 1301, the clock 1302, expiration date comparing portion 1303, the additional information deleting portion 1304 and the display portion 104 respectively correspond to additional information storing means, current time acquiring means, expiration date comparing means, additional information deleting means and related information display means according to the present invention.

Figure 14:
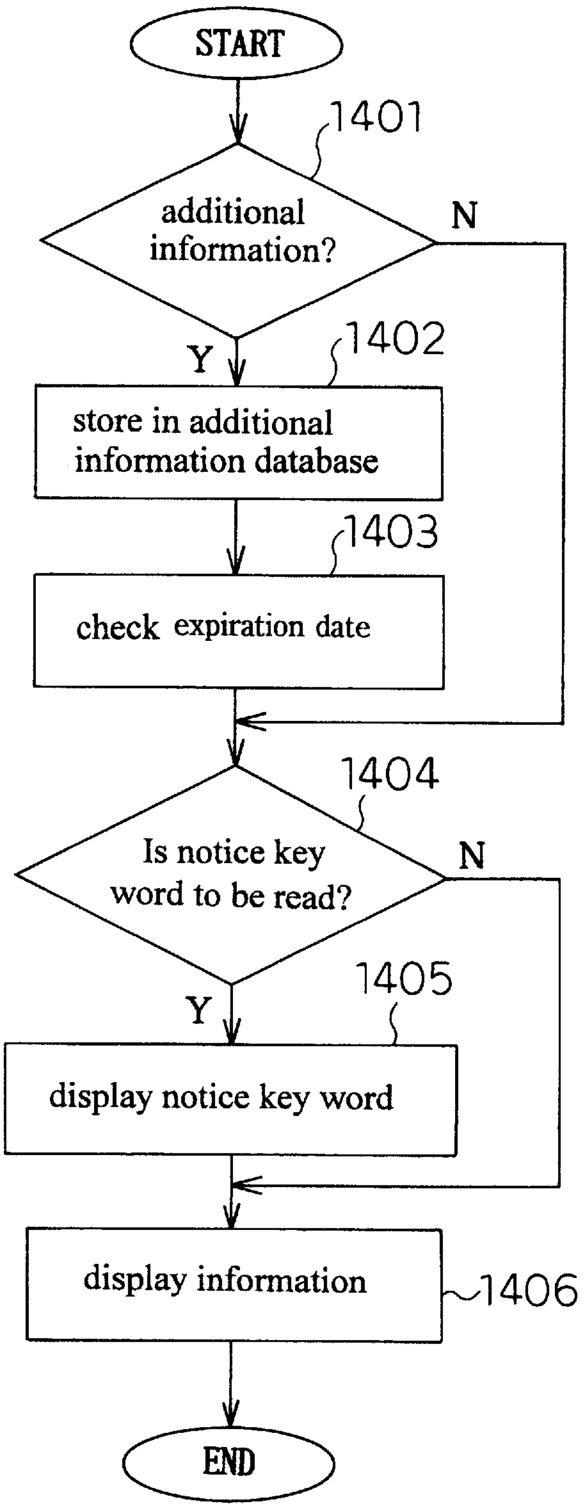
FIG. 14 is a flow chart showing an operational procedure of the fourth embodiment of the invention.

The operation of the information receiving apparatus having the above-described configuration will now be described with reference to the flow chart in FIG. 14.

At step 1401, reception data is decoded. A stream of a satellite wave received by a receiving antenna is assembled into packets, and a plurality of packets are reconstructed into a data unit (e.g., a file or a program). The reconstructed data does not necessarily include a notice key word. After the decoding, an identifier added to the data is determined. If it is additional information, the process proceeds to step 1402 and, if it is contents information, the process proceeds to step 1404.

At step 1402, received additional information is stored in the additional information database. The additional information consists of a classification item, a notice key word and the expiration date of the notice key word in a predetermined format. The classification item, the notice key word and the expiration date of the notice key word extracted according to the format are added to the additional information database. When a new notice key word for a previously received classification item is newly received, such information is overwritten. As shown in FIG. 15, the classification items, the notice key words and the expiration dates of the notice key words are stored in the additional information database in the order of the expiration dates in the form of a table.

At step 1403, a check is made to find any notice key word whose expiration date has expired. The notice key words stored in the additional information database are sequentially compared to the current time in the order of their expiration dates, and any notice key word whose expiration date has expired is deleted from the additional information database.

Steps 1404 through 1406 perform the same processes as those in steps 1003 through 1005 in the third embodiment of the invention.

As described above, a user can check the contents of the information for each classification item scheduled to be transmitted next.

Although satellite digital broadcasting is used as communication means in the fourth embodiment, a public switched telephone network, CATV network or surface wave broadcast may be used instead. The information receiving portion and the additional information receiving portion may use different means for communication. The information receiving portion and the additional information receiving portion may be provided as a single means instead of being separated from each other.

A fifth embodiment of the invention will now be described.

An information receiving apparatus utilizing satellite digital broadcasting will now be described as an embodiment of the invention.

Figure 16:
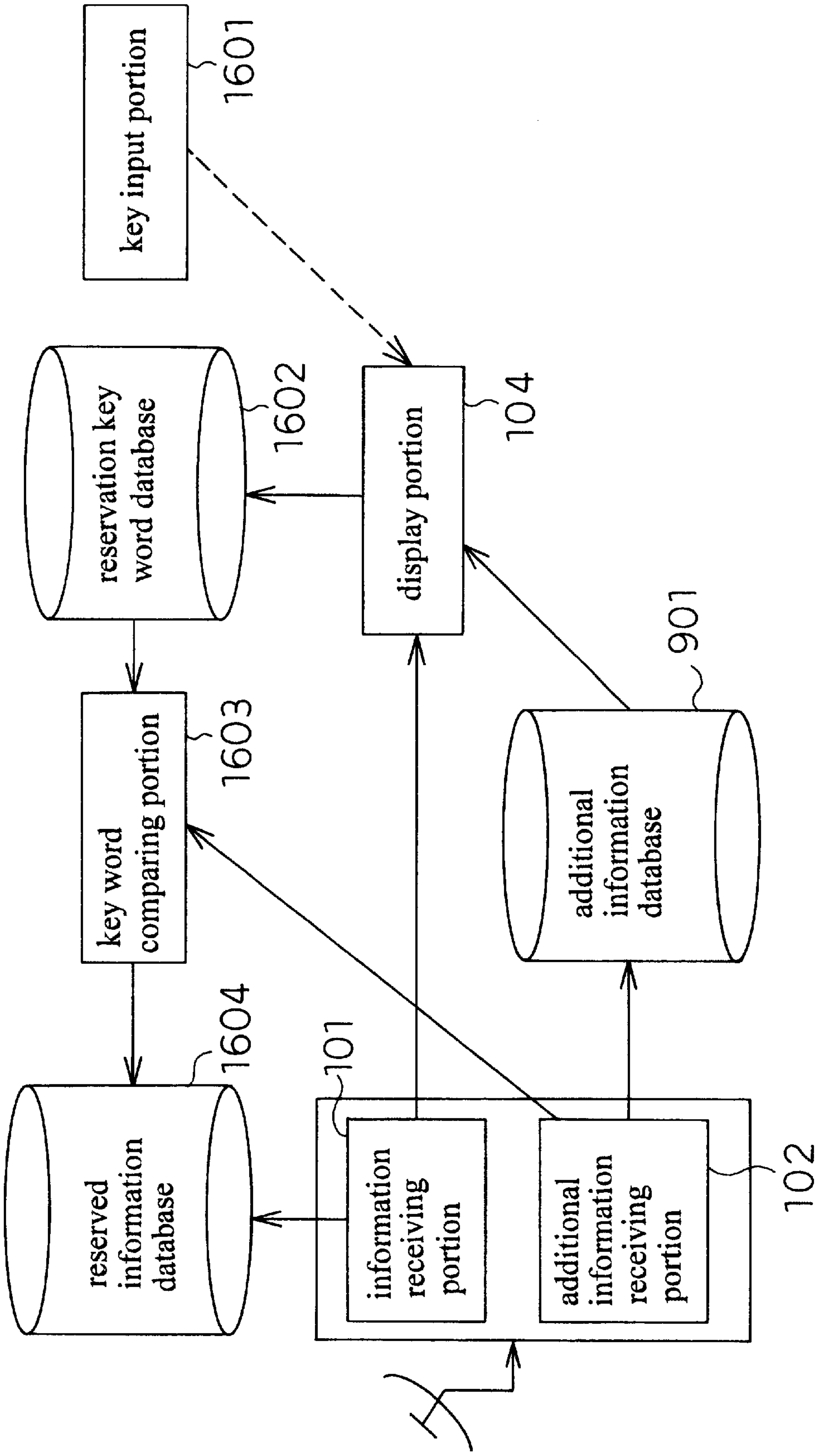
FIG. 16 is a system configuration diagram for a fifth embodiment of the invention.

FIG. 16 is a system configuration diagram according to the present embodiment. FIG. 16 includes the same parts as those in the system configuration for the third embodiment shown in FIG. 9. The following description will omit such parts which are indicated by like reference numbers and will be focused on only different parts.

In FIG. 16, a reference numeral 1601 designates a key input portion for allowing a user to make a reservation for received information upon looking at a notice key word which has been displayed on the display portion 104; and a reference numeral 1602 designates a reservation key word database for storing the notice key word for the information which has been reserved using the key input portion 1601 as a reservation key word and for storing also the classification item to which the notice key word belongs in association therewith. A reference numeral 1603 designates a key word comparing portion for comparing a reservation key word which has been stored in the reservation key word database and a content key word which has been received by the additional information receiving portion 102. The content key word is a key word which represents the contents of contents information as described above being currently transmitted as received by the additional information receiving portion 102. A reference numeral 1604 designates a reserved information database for storing received information when it is determined to be reserved contents information by the key word comparing portion 1603. When the key word comparing portion 1603 determines that those key words match each other as a result of the comparison, it serves as means for instructing the reserved contents information database 1604 to record the contents information associated with the content key word from the information receiving portion 101.

The key input portion 1601, the reservation key word database 1602, the key word comparing portion 1603, the reserved contents information database 1604 and the additional information receiving portion 102 respectively correspond to reservation specifying means, reservation key word storing means, key word comparing means, reservation information storing means and additional key word receiving means according to the present invention.

Figure 17:
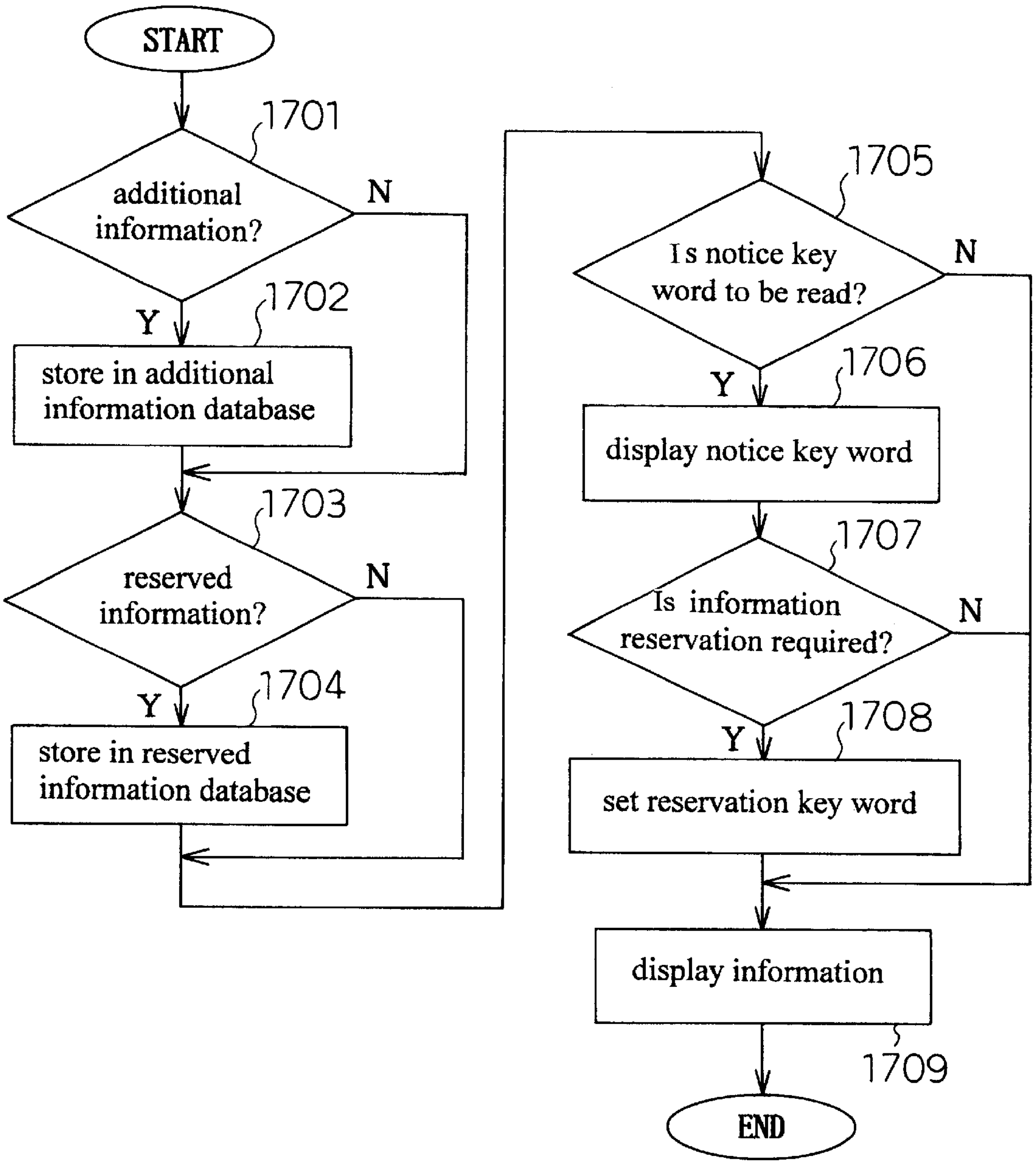
FIG. 17 is a flow chart showing an operational procedure of the fifth embodiment of the invention.

The operation of the information receiving apparatus having the above-described configuration will now be described with reference to the flow chart in FIG. 17.

At step 1701, reception data is decoded.. A stream of a satellite wave received by a receiving antenna is assembled into packets, and a plurality of packets are reconstructed into a data unit (e.g., a file or a program). The reconstructed data does not necessarily include a notice key word. After the decoding, an identifier added to the data is determined. If it is additional information, the process proceeds to step 1702 and, if it is contents information, the process proceeds to step 1703.

At step 1702, the received additional information is stored in the additional information database. The additional information consists of a classification item, a notice key word and the expiration date of the notice key word in a predetermined format. The classification item and the notice key word extracted according to the format are added to the additional information database. When a new notice key word for a previously received classification item is newly received, the notice key word is overwritten. As shown in FIG. 11, the classification items and the notice key words are stored in the additional information database in the form of a table.

It is determined at step 1703 whether the received information has been reserved by a user or not. A comparison is made between the key word stored in the reservation key word database and the content key word included in the additional information received this time. If they match each other, the process proceeds to step 1704 and, if not, the process proceeds to step 1705.

At step 1704, the contents information received by the information receiving portion is stored in the reservation information database.

It is determined at step 1705 whether the notice keywords are to be accessed or not. If the user wishes to access the notice key words, the process proceeds to step 1706 and, if not, the process proceeds to step 1709. The user can instruct his/her wish to look at notice key words using a key on a remote controller or a GUI on the screen.

At step 1706, the notice key words are displayed. The display portion 104 displays all information concerning the notice key words for all classification items stored in the additional information database 901.

At step 1707, a reservation based on the notice key word displayed on the display portion is accepted. If no reservation is made, the process proceeds to step 1709.

At step 1708, key inputs from the key input portion are accepted to allow a notice key word for reservation to be specified using the GUI on the display. The specified reservation key word is stored in the reservation key word database. The specified notice key word will be effective from the next reception of information.

Step 1709 performs the same process as that at step 1005 according to the third embodiment of the invention.

As described above, information to be saved is selected and stored using a notice key word.

Although satellite digital broadcasting is used as communication means in the fifth embodiment, a public switched. telephone network, CATV network or surface wave broadcast may be used instead. The information receiving portion and the additional information receiving portion may use different means for communication. The information receiving portion and the additional information receiving portion may be provided as a single means instead of being separated from each other.

A sixth embodiment of the invention will now be described.

An information receiving apparatus utilizing satellite digital broadcasting will now be described as an embodiment of the invention.

Figure 18:
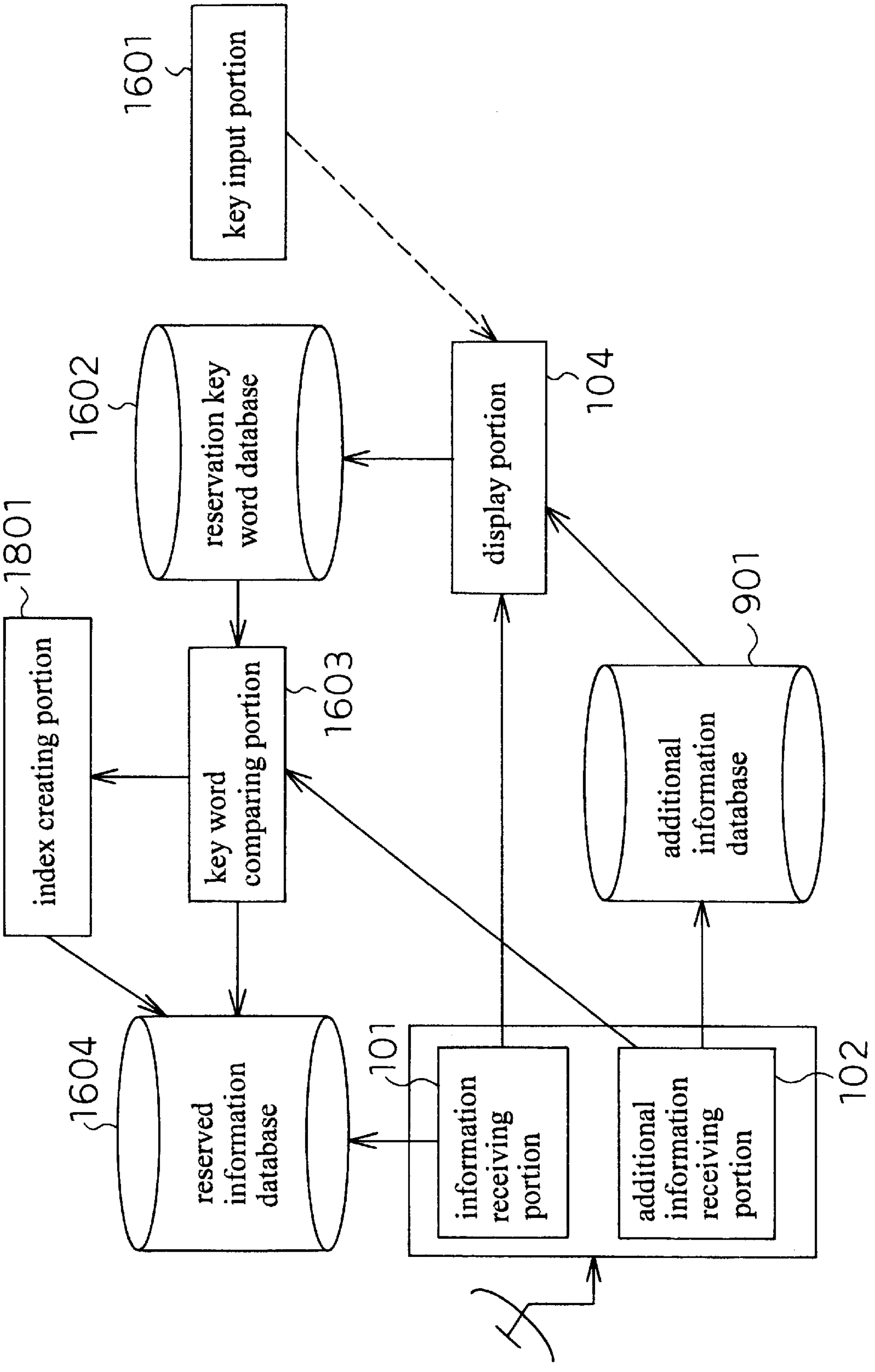
FIG. 18 is a system configuration diagram for a sixth embodiment of the invention.

FIG. 18 is a system configuration diagram according to the sixth embodiment of the invention. FIG. 18 includes the same parts as those in the system configuration for the fifth embodiment shown in FIG. 16. The following description will omit such parts which are indicated by like reference numbers and will be focused on only different parts.

In FIG. 18, a reference numeral 1801 designates an index creating portion. The index creating portion. 1801 is means for creating an index to be affixed to contents information recorded in the reserved contents information database 1604 upon an instruction from the key word comparing portion 1603. The index creating portion 1801 corresponds to reservation information creating means according to the present invention.

Figure 19:
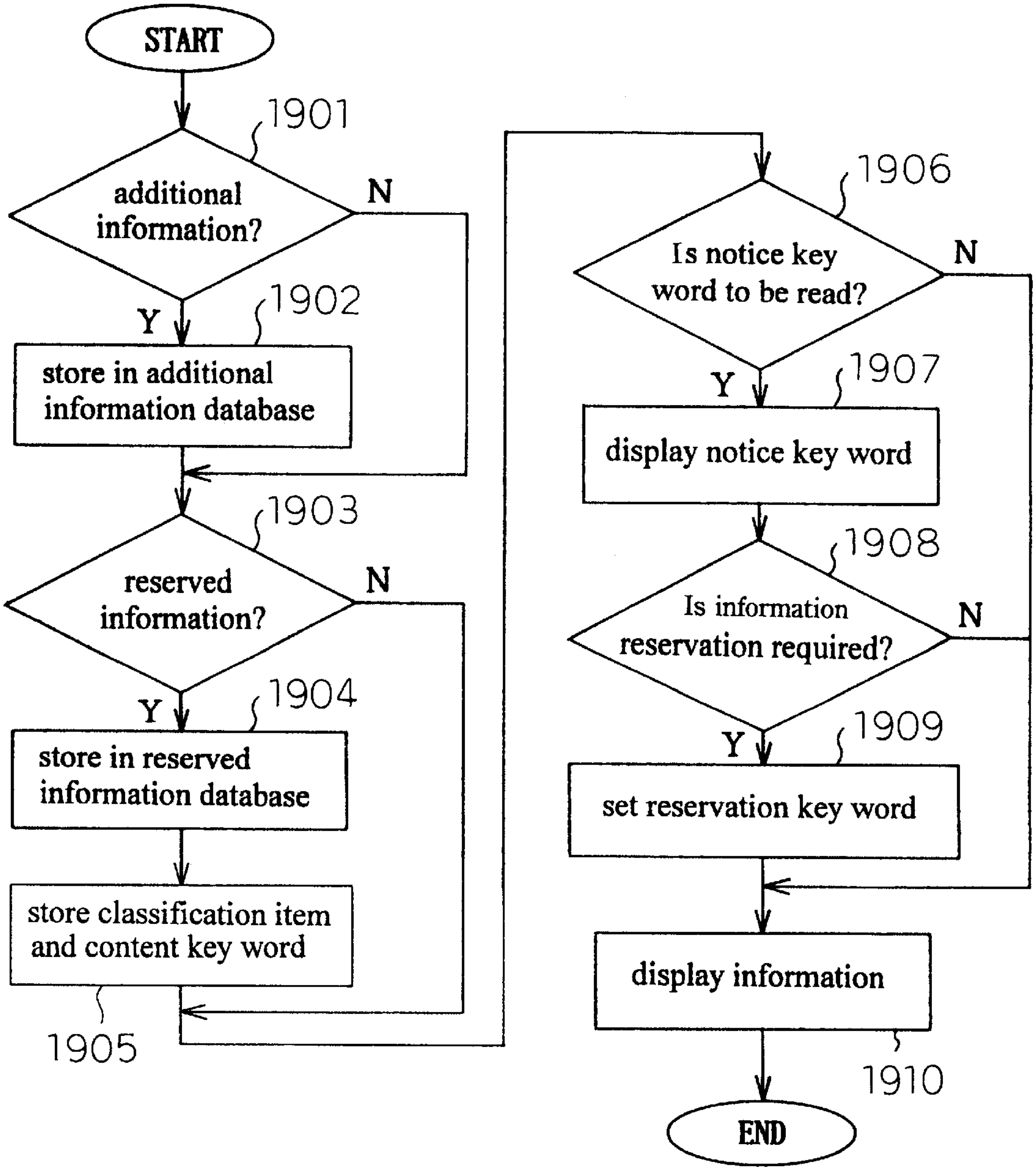
FIG. 19 is a flow chart showing an operational procedure of the sixth embodiment of the invention.

The operation of the information receiving apparatus having the above-described configuration will now be described with reference to the flow chart in FIG. 19.

Steps 1901 and 1902 perform the same operations as those at steps 1701 and 1702 of the fifth embodiment of the invention.

It is determined at step 1903 whether a user has made a reservation for received information. The key word stored in the reservation key word database is compared to the content key word included in the additional information currently received. If they match each other, the process proceeds to step 1904 and, if not, the process proceeds to step 1906.

At step 1904, the contents information received by the information receiving portion 101 (received information) is stored in the reserved information database 1604.

At step 1905, the classification item and the content key word associated with the contents information stored in the reserved information database 1604 are stored in the reserved information database 1604. As shown in FIG. 20, the classification items, contents key words and received information are saved in the reserved information database 1604 in association with each other in the form of a table.

Steps 1906 through 1910 perform the same processes as those at steps 1705 through 1709 of the fifth embodiment of the invention.

As described above, classification items and reservation key words are created as indices for reserved contents information (see FIG. 20) and are stored along with the contents information. While no hierarchy is established among classification items according to the sixth embodiment, a multi-layer hierarchy may be established for more specific classification.

Although satellite digital broadcasting is used as communication means in the sixth embodiment, a public switched telephone network, CATV network or surface wave broadcasting may be used instead. The information receiving portion and the additional information receiving portion may use different means for communication. The information receiving portion and the additional information receiving portion may be provided as a single means instead of being separated from each other.

A seventh embodiment of the invention will now be described.

An information receiving apparatus utilizing satellite digital broadcasting will now be described as an embodiment of the invention.

Figure 21:
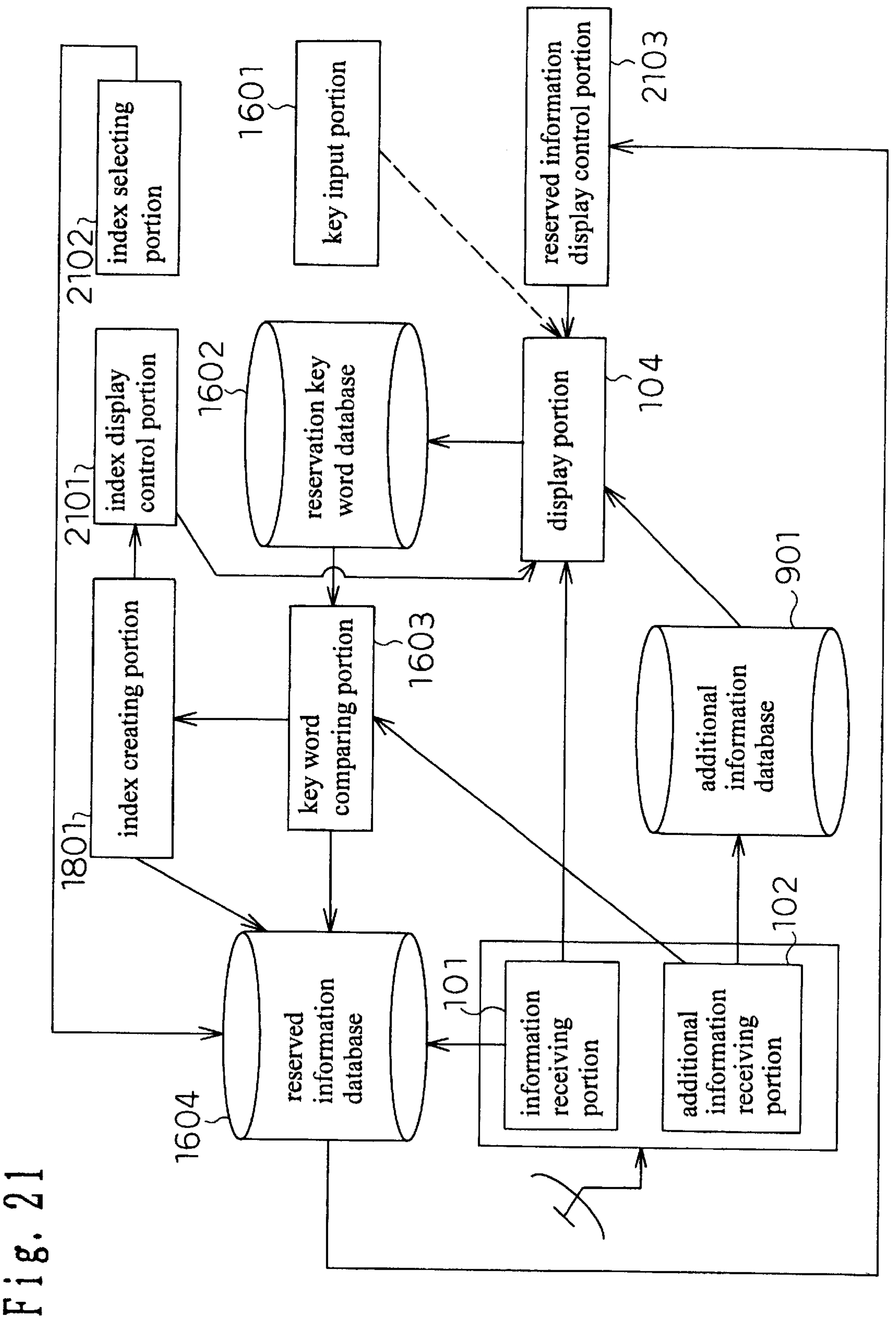
FIG. 21 is a system configuration diagram for a seventh embodiment of the invention.
Figure 22:
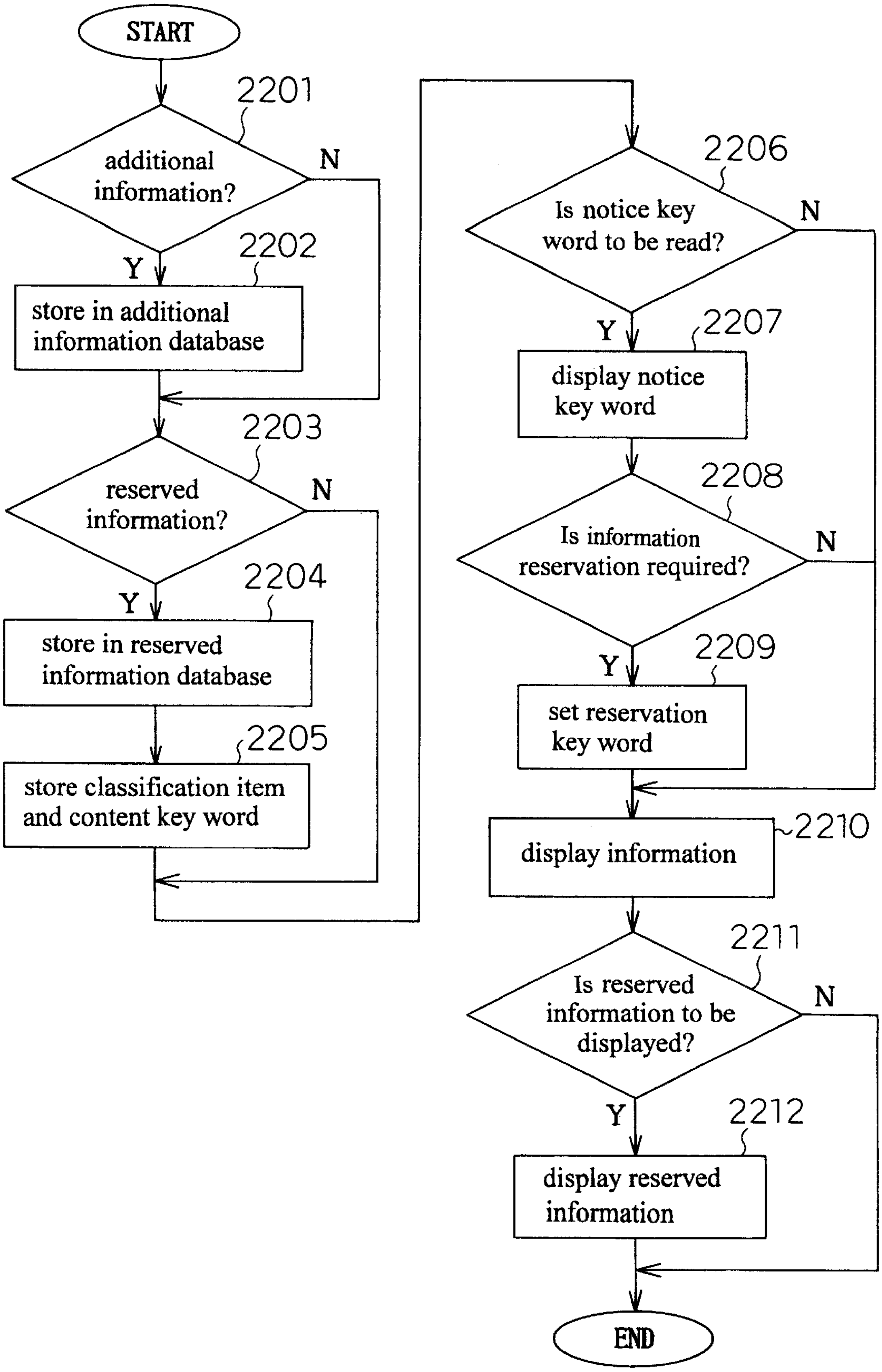
FIG. 22 is a flow chart showing an operational procedure of the seventh embodiment of the invention.

FIG. 21 is a system configuration diagram according to the seventh embodiment of the invention. FIG. 21 includes the same parts as those in the system configuration for the sixth embodiment shown in FIG. 18. The following description will omit such parts which are indicated by like reference numbers and will be focused on only different parts.

In FIG. 21, a reference numeral 2101 designates an index display control portion for displaying indices on the display portion 104; a reference numeral 2102 designates an index selecting portion for allowing a user to make a selection from among indices displayed on the display portion 104; and a reference numeral 2103 designates a reserved information display control portion for causing the display portion 104 to display information (contents information and index information) stored in the reserved information database 1604 using the index (indices) selected at the index selecting portion 2102.

The index display control portion 2101, the index selecting portion 2102 and the reserved information display control portion 2103 respectively correspond to index display means, the index selecting means and the reserved information display means according to the present invention.

Steps 2201 through 2210 perform the same processes as those at steps 1901 through 1910 of the sixth embodiment of the invention.

It is determined at step 2211 whether a user wishes to look at reserved information. If the user wishes to look at the reserved information, the process proceeds to step 2212 and, if not, the process is terminated. The user can instruct his/her wish to access the reserved information using, for example, a key on a remote controller or a GUI on a screen.

Figure 23:
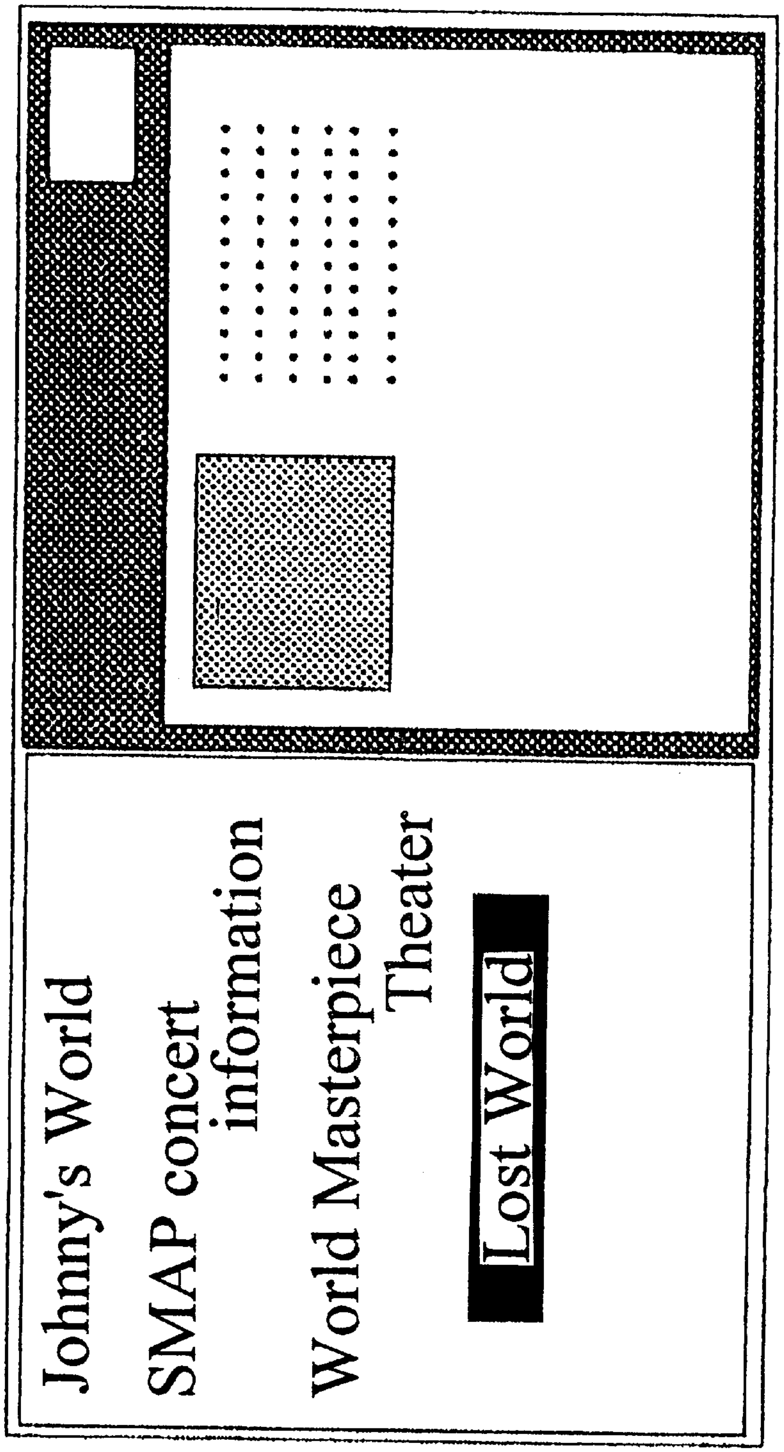
FIG. 23 is a view of an example of display according to the seventh embodiment of the invention.

At step 2212, the reserved information is displayed. An example of a method of display as shown in FIG. 23 will now be considered. The classification items and the key words associated information stored in the reserved information database are displayed on the left side of the screen. A selection is made on them using selecting means such as a remote controller to display a selected piece of information on the right side of the screen, This makes it possible to display and look at the reserved information.

Although satellite digital broadcasting is used as communication means in the seventh embodiment, a public switched telephone network, CATV network or surface wave broadcasting may be used instead. The information receiving portion and the additional information receiving portion may use different means for communication. The information receiving portion and the additional information receiving portion may be provided as a single means instead of being separated from each other.

An eighth embodiment of the invention will now be described.

An information receiving apparatus utilizing satellite digital broadcasting will now be described as an embodiment of the invention.

Figure 24:
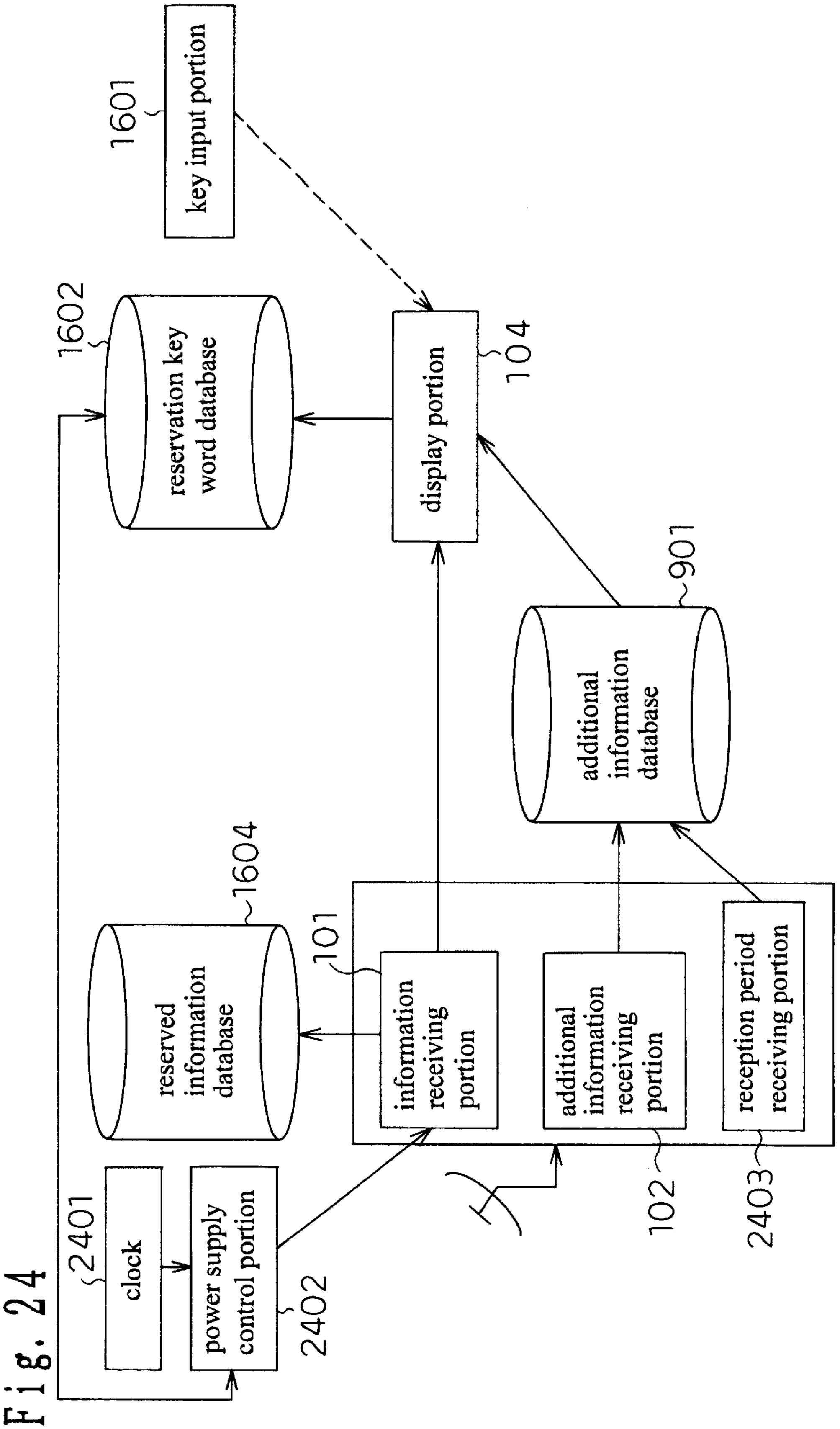
FIG. 24 is a system configuration diagram for an eighth embodiment of the invention.

FIG. 24 is a system configuration diagram according to the eighth embodiment of the invention. FIG. 24 includes the same parts as those in the system configuration for the fifth embodiment shown in FIG. 16. The following description will omit such parts which are indicated by like reference numbers and will be focused on only different parts.

In FIG. 24, a reference numeral 2401 designates a clock which provides the current time; and a reference numeral 2402 designates a power supply control portion for controlling power supplied to the receiving portion. The power supply control portion 2402 is means for supplying power to the information receiving portion 101 when the scheduled date and time of the next transmission stored in the reservation key word database 1602 agree with the current date and time provided by the clock 2401. A reference numeral 2403 designates a reception period receiving portion for receiving information on the period during which a piece of contents information transmitted by a transmitter station is received by a receiver (hereinafter referred to as "reception period"). The information on a reception period sent from a transmitter station may include information that identifies the channel over which the contents information (e.g., a broadcasting program) is broadcasted.

The clock 2401, the power supply control portion 2402 and the reception period receiving portion 2403 respectively correspond to current time acquiring means, power supply control means and reception period receiving means according to the invention.

Figure 25:
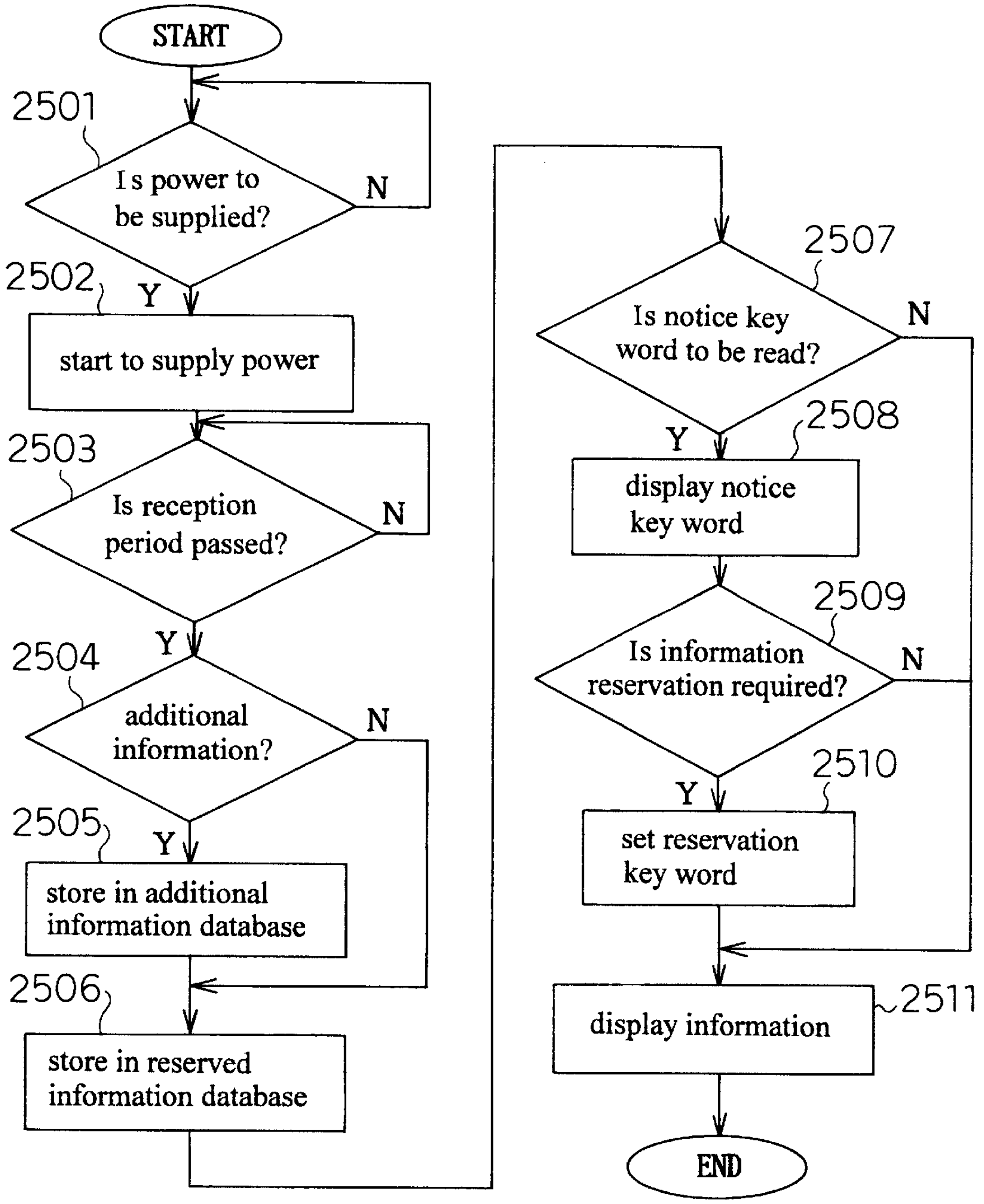
FIG. 25 is a flow chart showing an operational procedure of the eighth embodiment of the invention.

The operation of the information receiving apparatus having the above-described configuration will now be described with reference to the flow chart in FIG. 25.

It is determined at step 2501 whether power is to be supplied to the information receiving portion 101. As shown in FIG. 31, the scheduled date and time and reception period for the next transmission associated with each notice key word are stored in the additional information database 901. The power supply control portion 2402 compares the date and time with the current date and time provided by the clock 2401. If they agree with each other, the process proceeds to step 2502 and, if not, step 2501 is repeated.

A transmission time (any deviation between points of time of transmission and reception, i.e., time required for transmission) can not be neglected depending on the form of the communication path. In such a case, the above-described scheduled data and time for the next transmission may be sent with such a transmission time added thereon. This eliminates a need for providing the receiving apparatus with means for compensating for the deviation as described above to allow the receiving apparatus to have a simpler configuration. An alternative configuration is possible in which means for compensating for the deviation is provided at the receiving apparatus in advance. In such a configuration including compensation means at the receiving apparatus, the transmission time as described above will not be added to the scheduled date and time of the next transmission from the transmitting apparatus.

At step 2502, power is supplied to the information receiving portion 101 in accordance with an instruction from the power supply control portion 2402 to start the reception of information. The measurement of reception time at the information receiving portion 101 is also commenced.

At step 2503, the power supply control portion 2402 compares a reception time as described above with a reception period received by the reception period receiving portion 2403 and sent to and recorded in the additional information database 901. If the reception time is shorter than the reception period, the step 2503 is repeated. If not, the process proceeds to step 2504 to terminate the supply of power to the information receiving portion 101.

A reception period as described above can not be predicted depending on the form of the communication path as experienced in, for example, a public switched telephone network. In such a case, a period calculated on an assumption that transmission is made at the slowest communication rate may be sent as the reception period. In this case, an identifier indicating the completion of transmission of contents information is added at the end of the contents information. The receiving apparatus stops the supply of power to the information receiving portion 101 as soon as the identifier is received.

Alternatively, in the case of a configuration in which the deviation between transmission and reception periods is predictable and the transmission period of contents information scheduled to be transmitted is sent from the transmitter, predicting means as described below may be provided at the receiving apparatus. The predicting means is means for processing a period which is obtained by correcting the transmission period received by the receiving apparatus in advance depending on the state of the communication path as a reception period as described above. Obviously, a configuration may be employed in which a receiver takes a deviation as described above into account in advance.

At step 2504, reception data is decoded. A stream of a satellite wave received by a receiving antenna is assembled into packets, and a plurality of packets are reconstructed into a data unit (e.g., a file or program). The reconstructed data does not necessarily include a notice key word. After the decoding, an identifier added to the data is determined. If it is additional information, the process proceeds to step 2505 and, if it is contents information, the process proceeds to step 2506.

At step 2505, the received additional information is stored in the additional information database. The additional information consists of a classification item, a content key word, a notice key word, the scheduled date and time and reception period of the next transmission in a predetermined format. The additional information extracted according to the format is added to the additional information database 901. When a new notice key word for the previously received classification item is newly received, the notice key word is overwritten.

At step 2506, the information received by the information receiving portion 101 is stored in the reserved information database 1604.

Steps 2507 through 2511 perform the same processes as those at steps 1705 through 1709 in the fifth embodiment of the invention.

The amount of power required for receiving information is reduced as described above.

Although satellite digital broadcasting is used as communication means in the eighth embodiment, a public switched telephone network, CATV network or surface wave broadcasting may be used instead. The information receiving portion and the additional information receiving portion may use different means for communication.

The reception period may be established by a point in time at which information arrives and a point in time at which the reception is terminated.

Obviously, information may be acquired using the time of arrival of the information and the reception period without using the power control means.

While the key word comparing portion 1603 is not provided in the present embodiment, the present invention is not limited thereto and the key word comparing portion 1603 described with reference to FIG. 16 may be provided to compare not only points in time but also key words. This is advantageous in that the supply of power can be more reliably controlled even when the scheduled date and time for the broadcasting of a program are changed or when the broadcasting channel is changed.

A ninth embodiment of the invention will now be described.

An information receiving apparatus utilizing satellite digital broadcasting will now be described as an embodiment of the invention.

Figure 26:
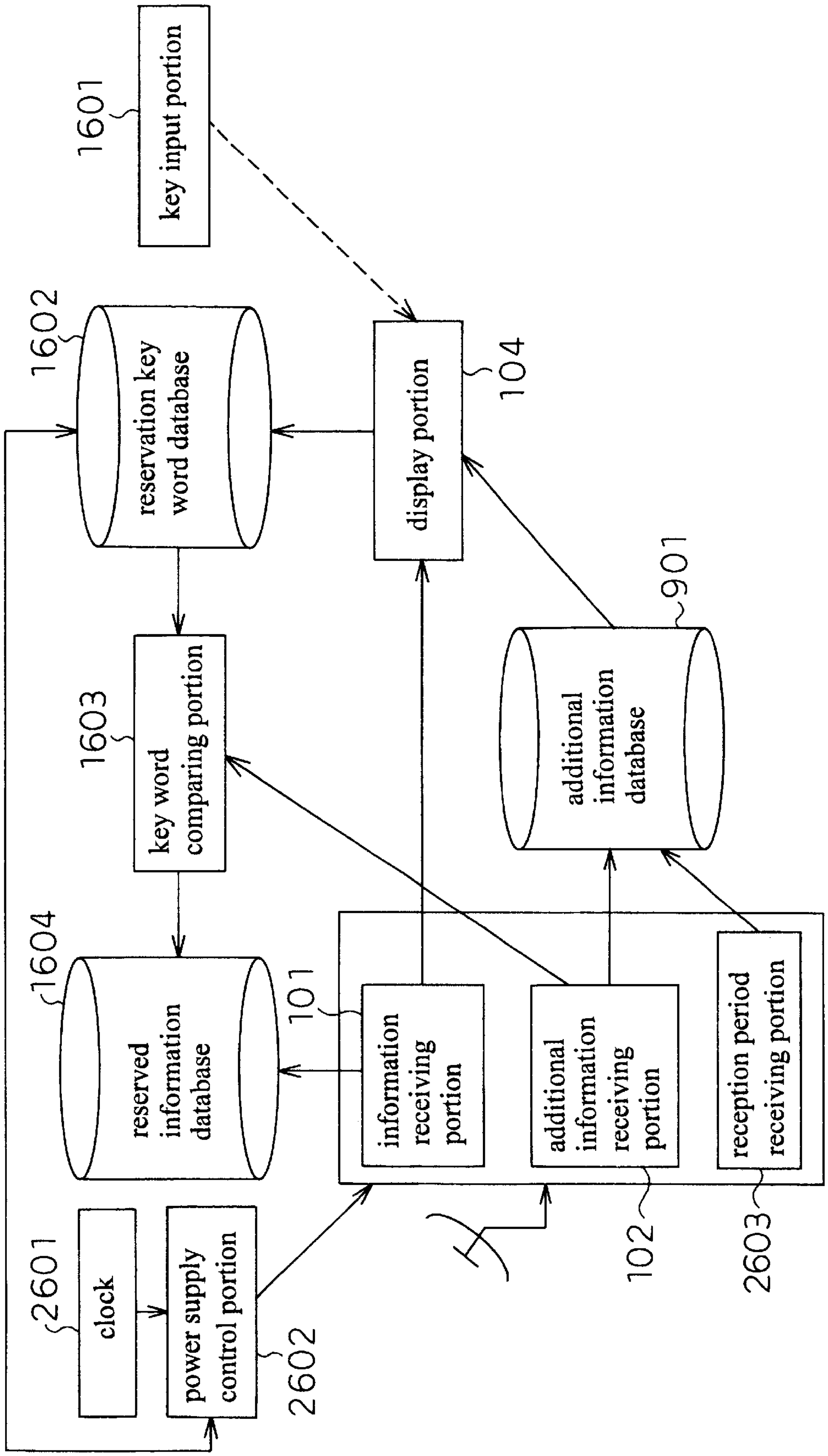
FIG. 26 is a system configuration diagram for a ninth embodiment of the invention.

FIG. 26 is a system configuration diagram according to the ninth embodiment of the invention. FIG. 26 includes the same parts as those in the system configuration for the fifth embodiment shown in FIG. 16. The following description will omit such parts which are indicated by like reference numbers and will be focused on only different parts.

In FIG. 26, a reference numeral 2601 designates a clock for providing the current time; 2602 designates a power supply control portion for controlling the supply of power to the receiving portion and the additional information receiving portion; and a reference numeral 2603 designates a reception period receiving portion.

The clock 2601, the power supply control portion 2602 and the reception period receiving portion 2603 respectively correspond to current time acquiring means, power supply control means and reception period receiving means in the context of the present invention.

The present embodiment employs the configuration described as the eighth embodiment (see FIG. 24) with a key word comparing portion 1603 added thereto. The present embodiment is therefore different from the eighth embodiment in which the recording of program is started based on a determination made only by comparing points in time.

That is, the present embodiment is advantageous in that reserved recording of a program can be more reliably carried out by means of the comparison of key words even when the scheduled date and time for the broadcasting of the program are changed or when the broadcasting channel is changed.

Figure 27:
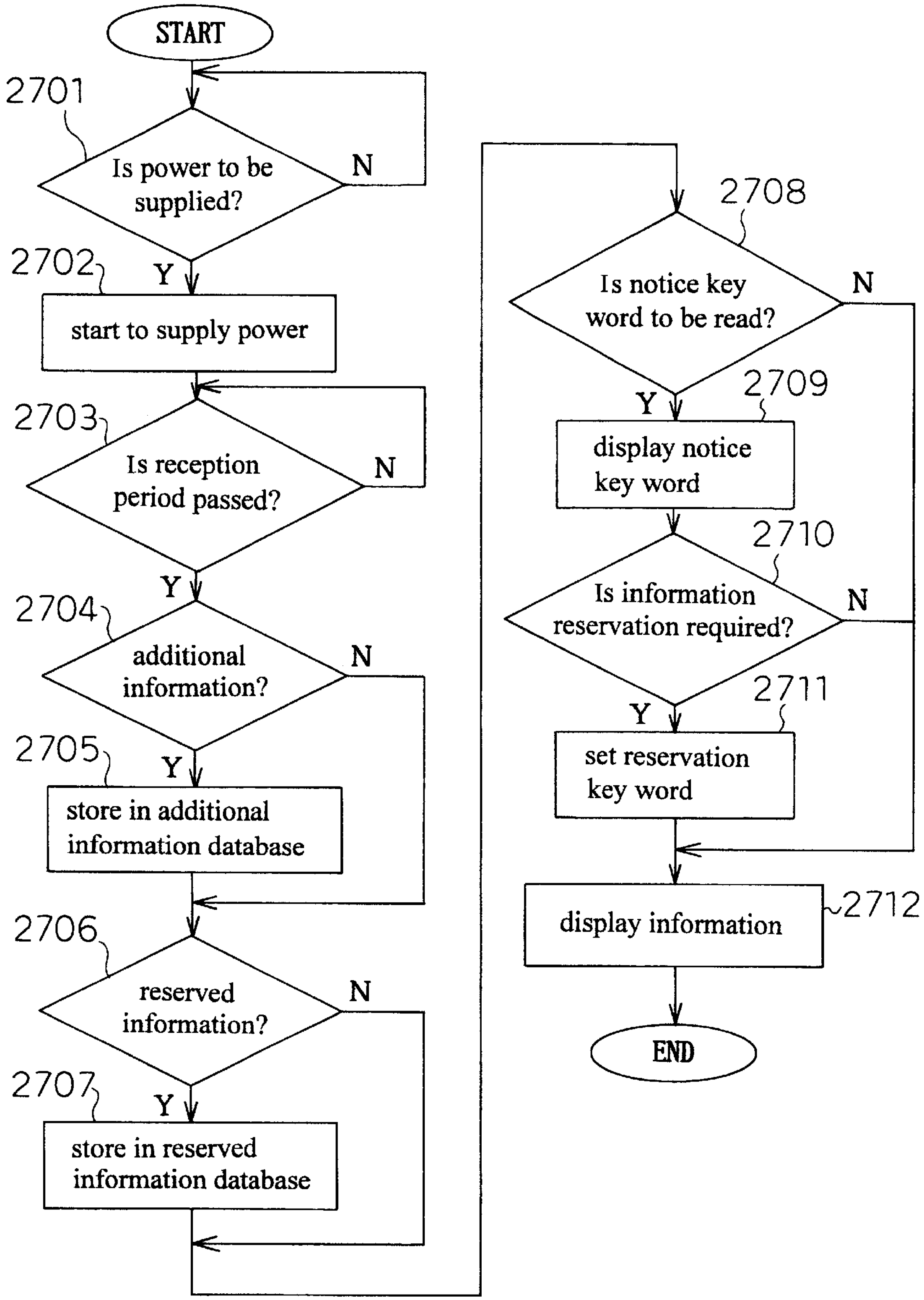
FIG. 27 is a flow chart showing an operational procedure of the ninth embodiment of the invention.

The operation of the information receiving apparatus having the above-described configuration will now be described with reference to the flow chart in FIG. 27.

It is determined at step 2701 whether to supply power to the information receiving portion and the additional information receiving portion. The scheduled date and time and the reception period for the next transmission are stored in the additional information database in association with each notice key word. The scheduled date and time are compared with the current data and time acquired from the clock 2601. If they agree with each other, the process proceeds to step 2702 and, if not, step 2701 is repeated.

The transmission time (any deviation between the points of time of transmission and reception, i.e., time required for transmission) can not be neglected depending on the form of the communication path. In such a case, the above-described scheduled data and time for the next transmission may be sent with such a transmission time added thereon. This eliminates a need for providing the receiving apparatus with means for compensating for the deviation as described above to allow the receiving apparatus to have a simpler configuration. An alternative configuration is possible in which means for compensating for the deviation is provided at the receiving apparatus in advance. In such a configuration including compensation means at the receiving apparatus, a transmission time as described above will not be added to the scheduled date and time of the next transmission from the transmitting apparatus.

At step 2702, power is supplied to the information receiving portion and the additional information receiving portion to start the reception of information. The measurement of reception time is also commenced.

At step 2703, the reception time is compared with the reception period in the additional information database. If the reception time is shorter, step 2703 is repeated and, if not, the process proceeds to step 2704 to terminate the supply of power to the information receiving portion and the additional information receiving portion.

A reception period as described above can not be predicted depending on the form of the communication path as experienced in, for example, a public switched telephone network. In such a case, a period calculated on an assumption that transmission is made at the slowest communication rate may be sent as the reception period. In this case, an identifier indicating the completion of transmission of contents information is added at the end of the contents information. The receiving apparatus stops the supply of power to the information receiving portion 101 as soon as the identifier is received.

Alternatively, in the case of a configuration in which the deviation between transmission and reception periods is predictable and the transmission period of contents information scheduled to be transmitted is sent from the transmitter, predicting means similar to that described in the eighth embodiment may be provided at the receiving apparatus.

Steps 2704 and 2705 perform the same processes as those at steps 2504 and 2505 of the eighth embodiment.

Steps 2706 through 2712 perform the same processes as those at steps 1703 through 1709 of the eighth embodiment.

The amount of power required for receiving information is reduced as described above.

Although satellite digital broadcasting is used as communication means in the ninth embodiment, a public switched telephone network, CATV network or surface wave broadcast may be used instead. The information receiving portion, the additional information receiving portion and the reception period receiving portion may use different means for communication.

A reception period may be established by a point in time at which information arrives and a point in time at which the reception is terminated.

Obviously, information may be acquired using the time of arrival of the information and the reception period without using the power control means.

A tenth embodiment of the invention will now be described.

An information receiving apparatus utilizing satellite digital broadcasting will now be described as an embodiment of the invention.

Figure 29:
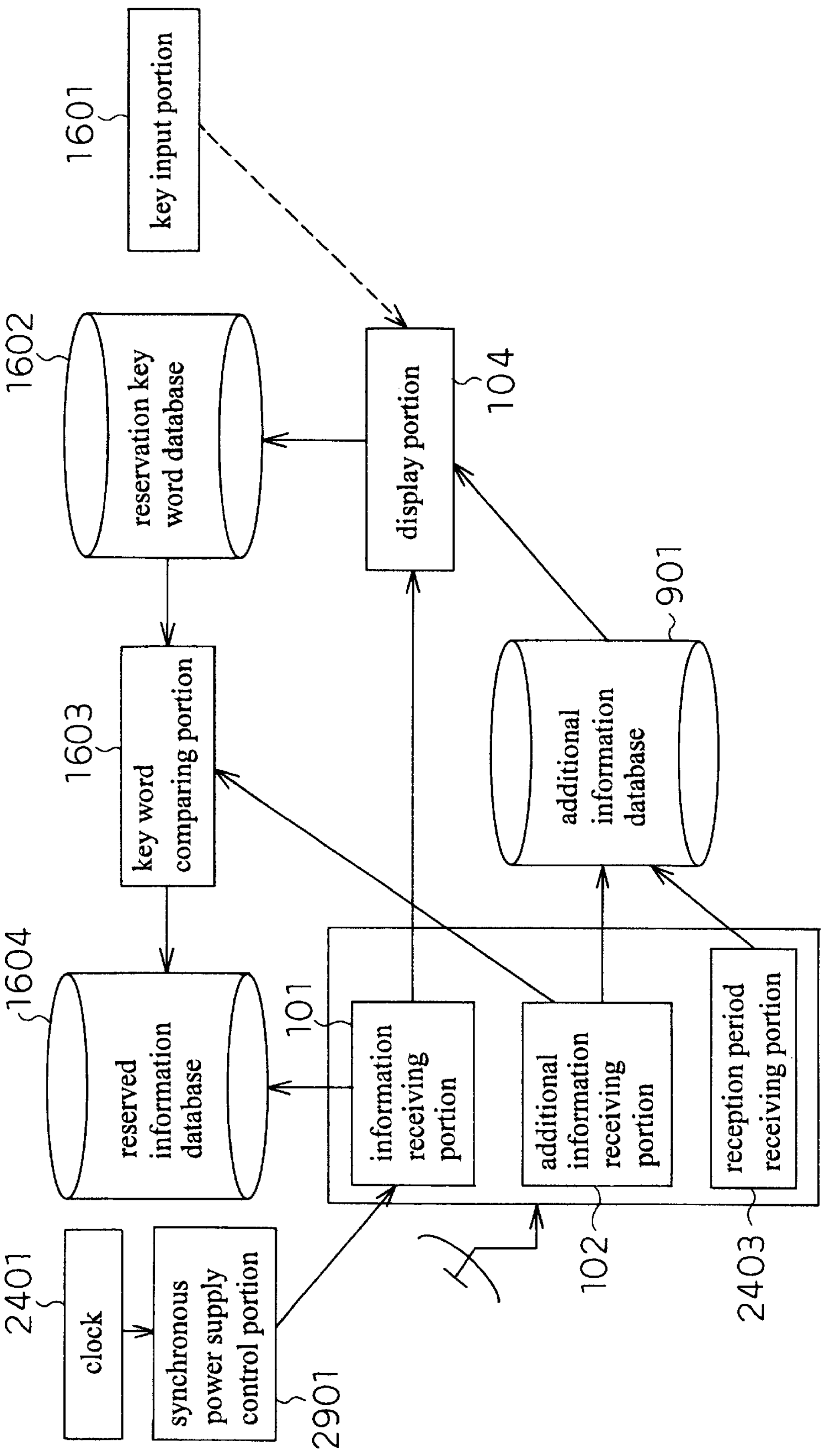
FIG. 29 is a system configuration diagram for a tenth embodiment of the invention.

FIG. 29 is a system configuration diagram according to the tenth embodiment of the invention. FIG. 29 includes the same parts as those in the system configuration for the eighth embodiment shown in FIG. 24. The following description will omit such parts which are indicated by like reference numbers and will be focused on only different parts.

In FIG. 29, a reference numeral 2901 designates a synchronous power supply control portion for controlling the supply of power to the receiving portion and the additional information receiving portion in synchronism with the transmission time of particular contents information.

The synchronous power supply control portion 2901 corresponds to synchronous power supply control means in the context of the present invention.

Figure 30:
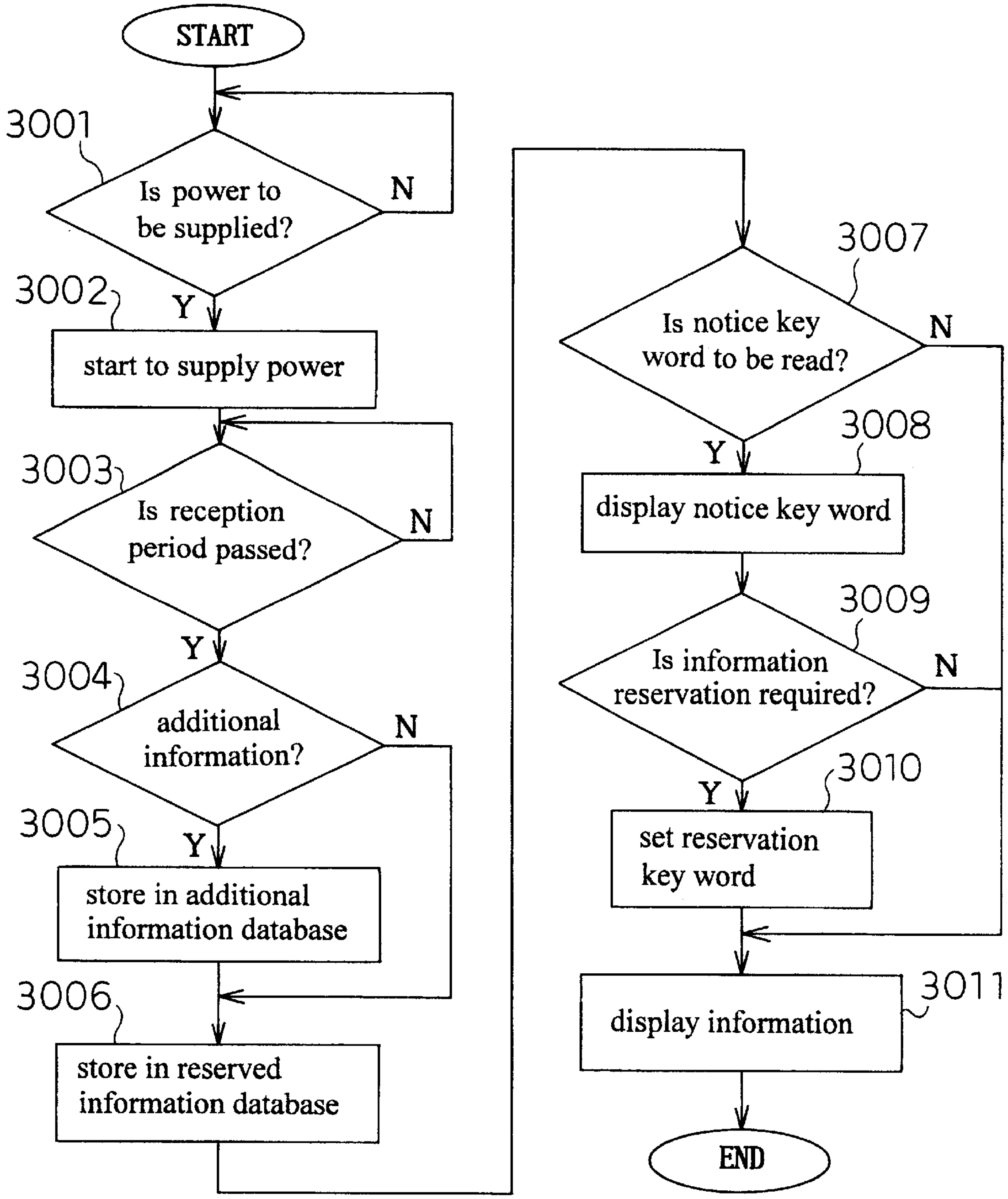
FIG. 30 is a flow chart showing an operational procedure of the tenth embodiment of the invention.

The operation of the information receiving apparatus having the above-described configuration will now be described with reference to the flow chart in FIG. 30.

It is determined at step 3001 whether to supply power to the information receiving portion. As shown in FIG. 31, the additional information database accumulates the scheduled date and time of transmission and reception period of the particular information and the scheduled date and time of and reception period of the next transmission associated with each notice key word. For example, the particular information is highly common information such as news and weather forecasts. Such highly common information is received without fail because it is assumed that users are likely to access such information. Therefore, the scheduled date and time for transmission and reception period for the particular information are maintained in the additional information database. The provider of the information transmits the particular information periodically. In order to transmit the notice key word to a receiver of the information with reliability, the information provider transmits the notice key word simultaneously with the particular information.

The scheduled date and time stored in the additional information database is compared with the current date and time acquired from the clock 2401. If they agree with each other, the process proceeds to step 3002 and, if not, step 3001 is repeated.

The transmission time (any deviation between the points of time of transmission and reception, i.e., time required for transmission) can not be neglected depending on the form of the communication path. In such a case, the above-described scheduled data and time for the next transmission may be sent with such a transmission time added thereon. This eliminates a need for providing the receiving apparatus with means for compensating for the deviation as described above to allow the receiving apparatus to have a simpler configuration. An alternative configuration is possible in which means for compensating for the deviation is provided at the receiving apparatus in advance. In such a configuration including compensation means at the receiving apparatus, a transmission time as described above will not be added to the scheduled date and time of the next transmission from the transmitting apparatus.

Steps 3002 through 3011 perform the same processes at steps 2502 through 2511 of the eighth embodiment.

As described above, the amount of power required for receiving information is reduced, and particular information and the notice key word associated therewith are reliably received.

Although satellite digital broadcasting is used as communication means in the tenth embodiment, a public switched telephone network, CATV network or surface wave broadcasting may be used instead. The information receiving portion, additional information receiving portion and reception period receiving portion may use different means for communication.

A reception period may be established by a point in time at which information arrives and a point in time at which the reception is terminated.

Obviously, information may be acquired using the time of arrival of the information and the reception period without using the power control means.

An eleventh embodiment of the invention will now be described.

An information receiving apparatus utilizing satellite digital broadcasting will now be described as an embodiment of the invention.

Figure 32:
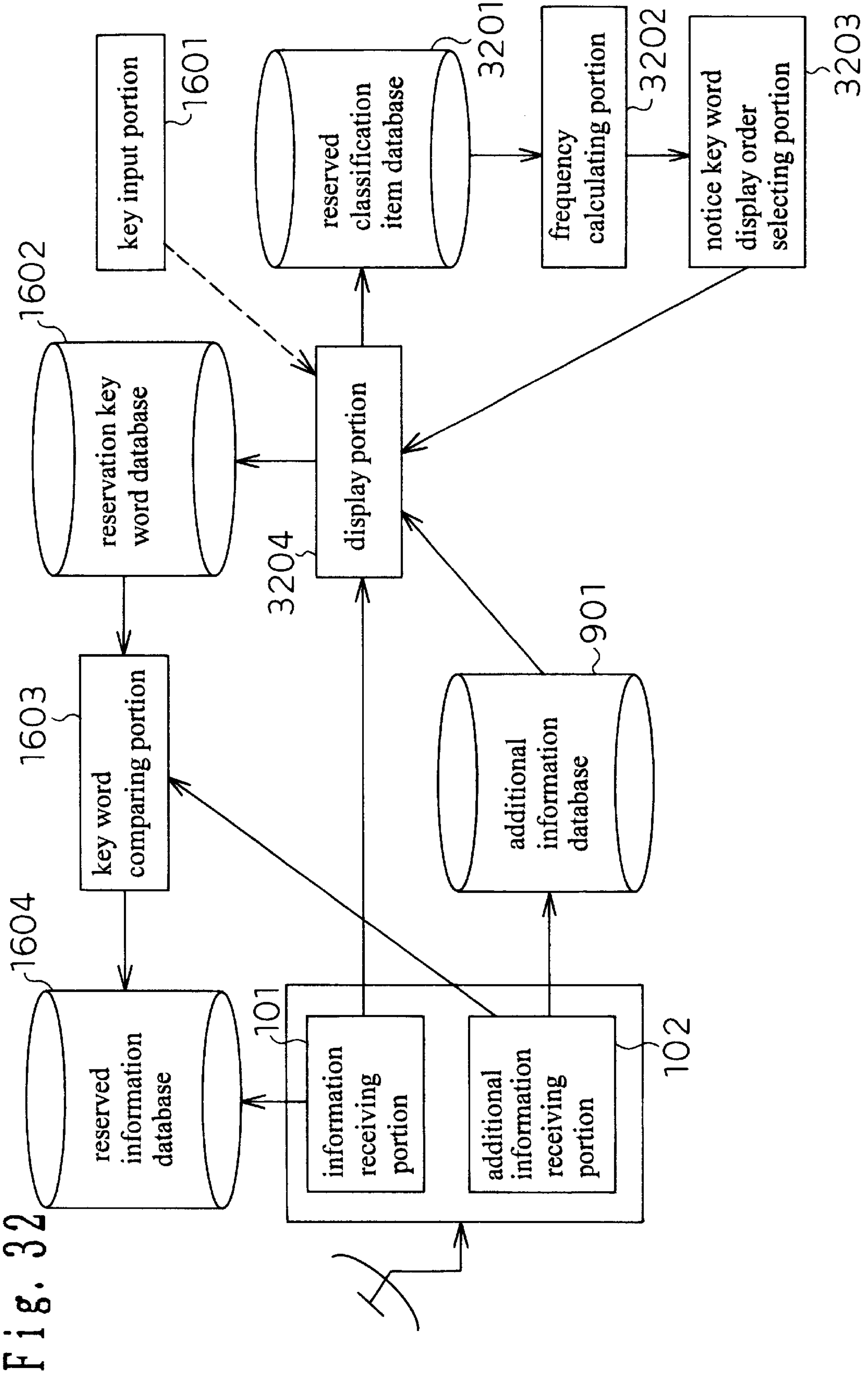
FIG. 32 is a system configuration diagram for an eleventh embodiment of the invention.

FIG. 32 is a system configuration diagram according to the eleventh embodiment of the invention. FIG. 32 includes the same parts as those in the system configuration for the fifth embodiment shown in FIG. 16. The following description will omit such parts which are indicated by like reference numbers and will be focused on only different parts.

In FIG. 32, a reference numeral 3201 designates a reserved classification item database; a reference numeral 3202 designates a frequency calculating portion; a reference numeral 3203 designates a notice key word display order selecting portion; and a reference numeral 3204 designates a display portion. The reserved classification item database 3201 is means for storing the classification items for pieces of contents information with notice key words which have been reserved.

The reserved classification item database 3201, the frequency calculating portion 3202, the notice key word display order selecting portion 3203 and the display portion 3204 respectively correspond to reserved classification item storing means, frequency calculating means, display order selecting means and display means in the context of the present invention.

Figure 33:
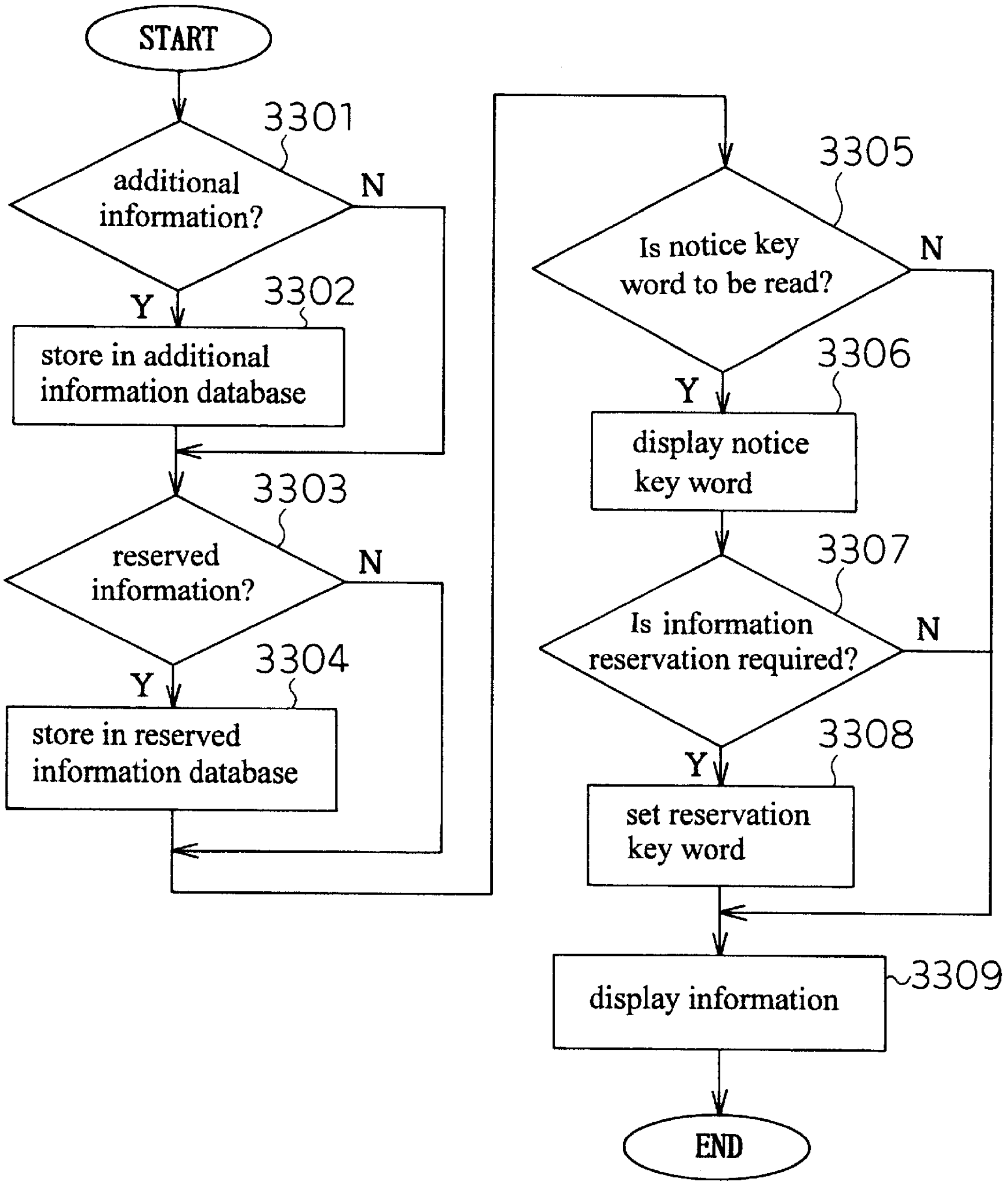
FIG. 33 is a flow chart showing an operational procedure of the eleventh embodiment of the invention.

The operation of the information receiving apparatus having the above-described configuration will now be described with reference to the flow chart in FIG. 33.

Steps 3301 through 3305 perform the same operations as those at steps 1701 through 1705 in the fifth embodiment.

At step 3306, notice keywords are displayed. The notice key words are displayed on the display portion 3204 for all of the classification items for information stored in the additional information database 901. The classification items are displayed in an order which is based on the frequencies thereof stored in the reserved classification item database 3201. The frequencies are calculated by the frequency calculating portion 3202 and the notice key word display order selecting portion 3203 determines the order of display based on the result of the calculation. For example, the display may begin with the classification item that covers the greatest amount of reserved information.

The frequency will now be described in greater detail. For example, the reserved classification item database 3201 accumulates the classification items for notice key words which have been reserved in the order of reservation as shown in FIG. 42. The frequency calculating portion 3202 calculates the frequencies of the reserved classification items stored in the reserved classification item database 3201. In the example shown in FIG. 42, "Johnny's World" appears five times; "World Masterpiece Theater" appears once; and "Asian Travel" appears twice. The reserved notice key word display order deleting portion 3203 determines the order of display based on the order of frequencies calculated by the frequency calculating portion 3202, i.e., "Johnny's World", "Asian Travel" and "World Masterpiece Theater" are displayed in that order.

At step 3307, reservation based on a notice key word displayed on the display portion is accepted. If no reservation is made, the process proceeds to step 3309.

At step 3308, key inputs from the key input portion are accepted to allow a notice key word for reservation to be specified using the GUI on the display. A specified reservation key word is stored in the reservation key word database, and a specified classification item is recorded in the reserved classification item database. The specified notice key word will be effective from the next reception of information.

Step 3309 performs the same process as that at step 1709 of the fifth embodiment of the invention.

As described above, information to be saved is selected and stored using a notice key word, and notice key words used for reservation are displayed in an order which facilitates users' selection.

Although satellite digital broadcasting is used as. communication means in the eleventh embodiment, a public switched telephone network, CATV network or surface wave broadcasting may be used instead. The information receiving portion and the additional information receiving portion may use different means for communication. The information receiving portion and the additional information receiving portion may be provided as a single means instead of being separated from each other.

A twelfth embodiment of the invention will now be described.

An information receiving apparatus utilizing satellite digital broadcasting will now be described as an embodiment of the invention.

Figure 34:
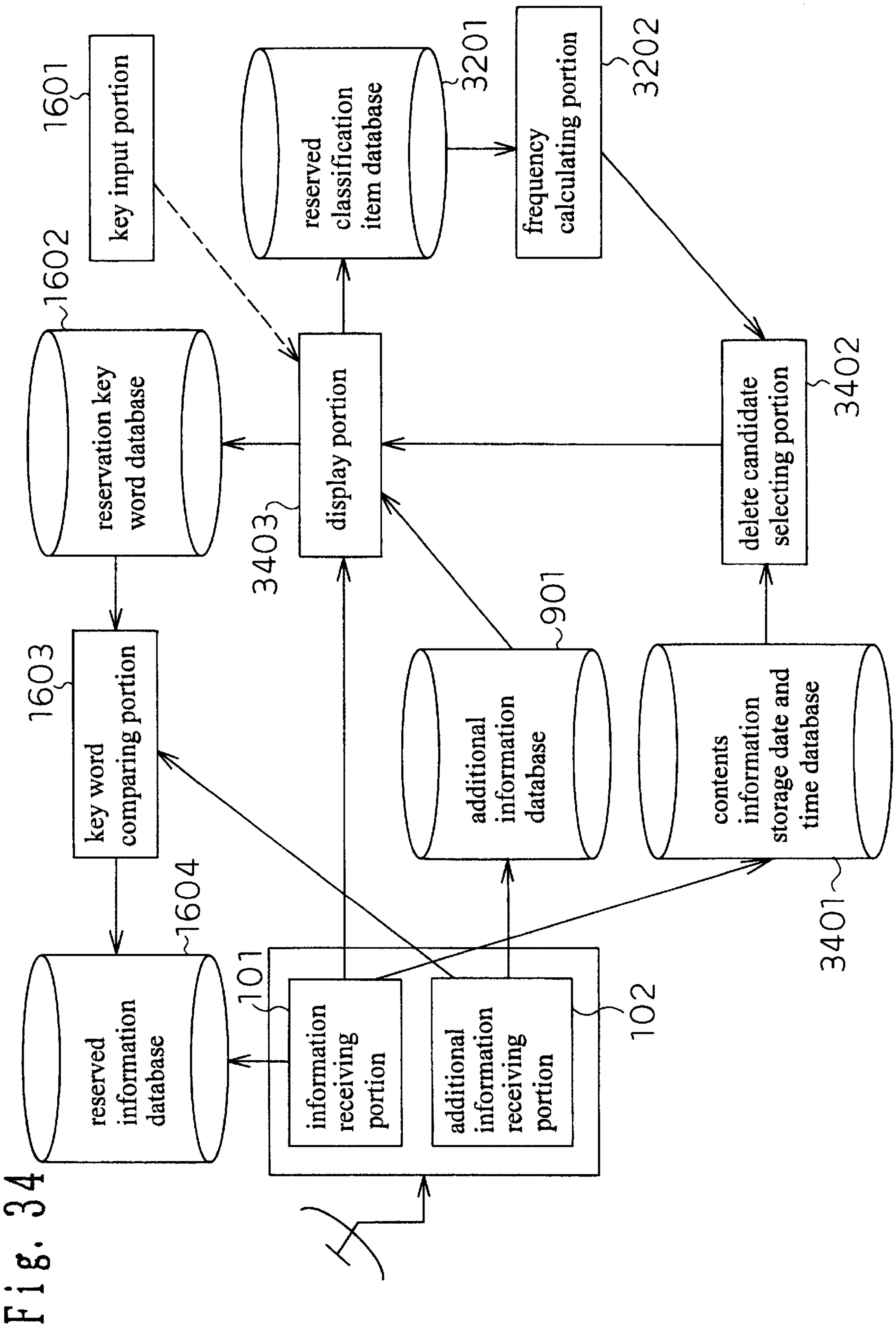
FIG. 34 is a system configuration diagram for a twelfth embodiment of the invention.

FIG. 34 is a system configuration diagram according to the twelfth embodiment of the invention. FIG. 34 includes the same parts as those in the system configuration for the eleventh embodiment shown in FIG. 32. The following description will omit such parts which are indicated by like reference numbers and will be focused on only different parts.

In FIG. 34, a reference numeral 3401 designates a contents information storage date and time database; a reference numeral 3402 designates a delete candidate selecting portion; and a reference numeral 3403 designates a display portion. The contents information storage date and time database 3401, the delete candidate selecting portion 3402 and the display portion 3403 respectively correspond to contents information storage storing means, delete candidate selecting means and display means in the context of the present invention.

Figure 35:
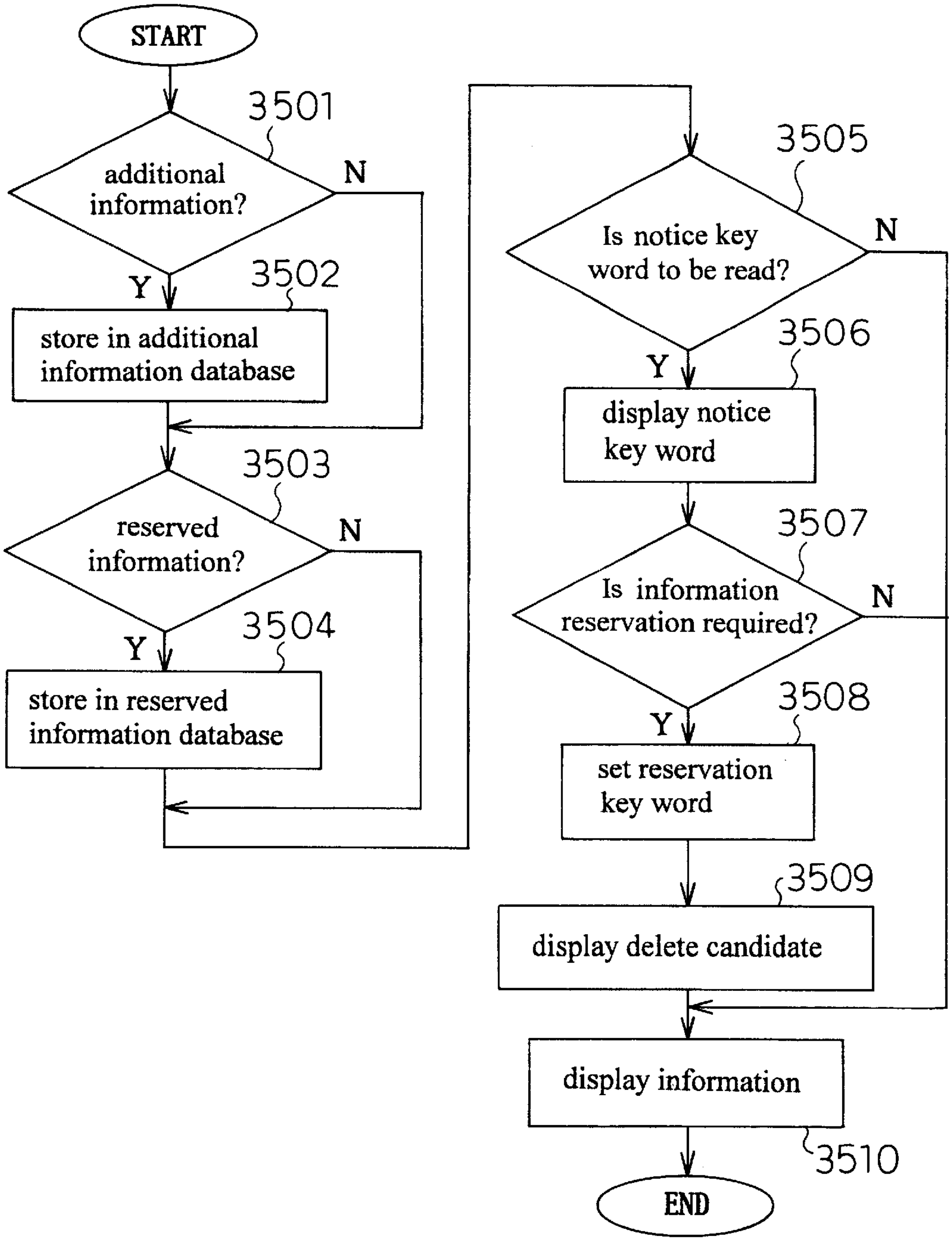
FIG. 35 is a flow chart showing an operational procedure of the twelfth embodiment of the invention.

The operation of the information receiving apparatus having the above-described configuration will now be described with reference to the flow chart in FIG. 35.

Steps 3501 through 3503 perform the same operations as those at steps 3301 through 3303 in the eleventh embodiment.

At step 3504, contents information received by the information receiving portion is stored in the reserved information database, and the date and time of storage is stored in the contents information storage date and time database.

Step 3505 performs the same operation as that at step 3305 of the eleventh embodiment.

At step 3506, notice key words are displayed. The notice key words are displayed on the display portion 3204 for all of the classification items for information stored in the additional information database 901.

Steps 3507 and 3508 perform the same operations as those at steps 3307 and 3308 of the eleventh embodiment.

At step 3509, candidates of contents information to be deleted are displayed. For example, five candidates of contents information to be deleted are selected in the order of oldness of the dates and times when they were stored. Alternatively, all pieces of information belonging to the classification item including the smallest amount of the stored contents information may be deleted. Other method for selection may obviously used. Candidates for deletion may be selected only when the number of pieces of the stored contents information exceeds a predetermined value instead of being selected each time reservation is made.

Step 3510 performs the same process as that in step 3309 of the eleventh embodiment.

As described above, the notice key words are used to select and accumulate information to be saved and to display the candidates of contents information to be deleted.

Although the candidates for deletion are displayed when contents information is reserved in the above description, such a display may be made when a user wishes to delete contents information. This may be performed, for example, using a key on a remote controller or GUI on a screen.

Further, although satellite digital broadcasting is used as communication means in the twelfth embodiment, a public switched telephone network, CATV network or surface wave broadcast may be used instead. The information receiving portion and the additional information receiving portion may use different means for communication. The information receiving portion and the additional information receiving portion may be provided as a single means instead of being separated from each other.

A thirteenth embodiment of the invention will now be described.

An information receiving apparatus utilizing satellite digital broadcasting will now be described as an embodiment of the invention.

Figure 36:
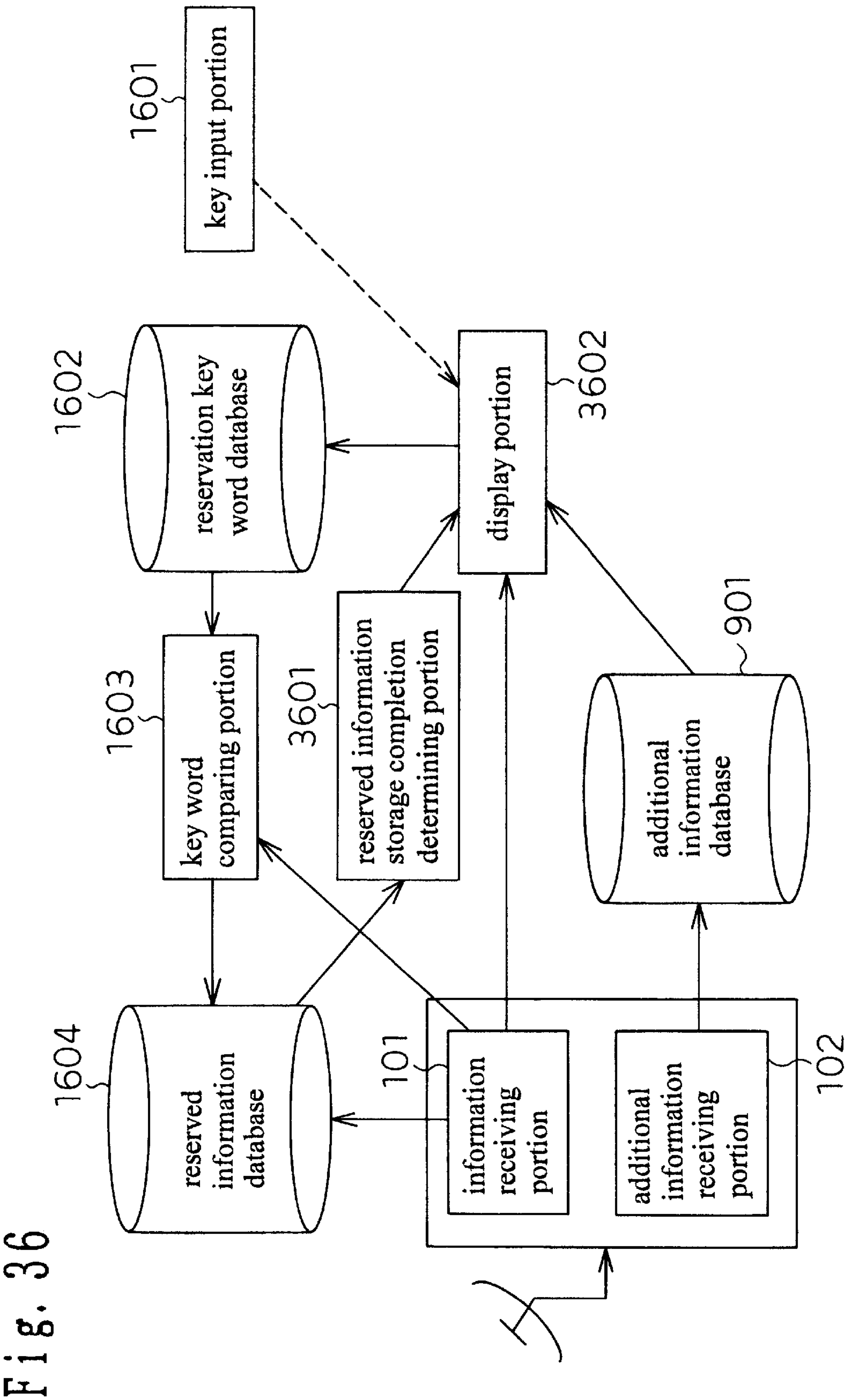
FIG. 36 is a system configuration diagram for a thirteenth embodiment of the invention.

FIG. 36 is a system configuration diagram according to the thirteenth embodiment of the invention. FIG. 36 includes the same parts as those in the system configuration for the fifth embodiment shown in FIG. 16. The following description will omit such parts which are indicated by like reference numbers and will be focused on only different parts.

In FIG. 36, a reference numeral 3601 designates a reserved information storage completion determining portion and a reference numeral 3602 designates a message display portion. The reserved information storage completion determining portion 3601 and the message display portion 3602 respectively correspond to reserved information storage completion determining means and message display means in the context of the present invention.

Figure 37:
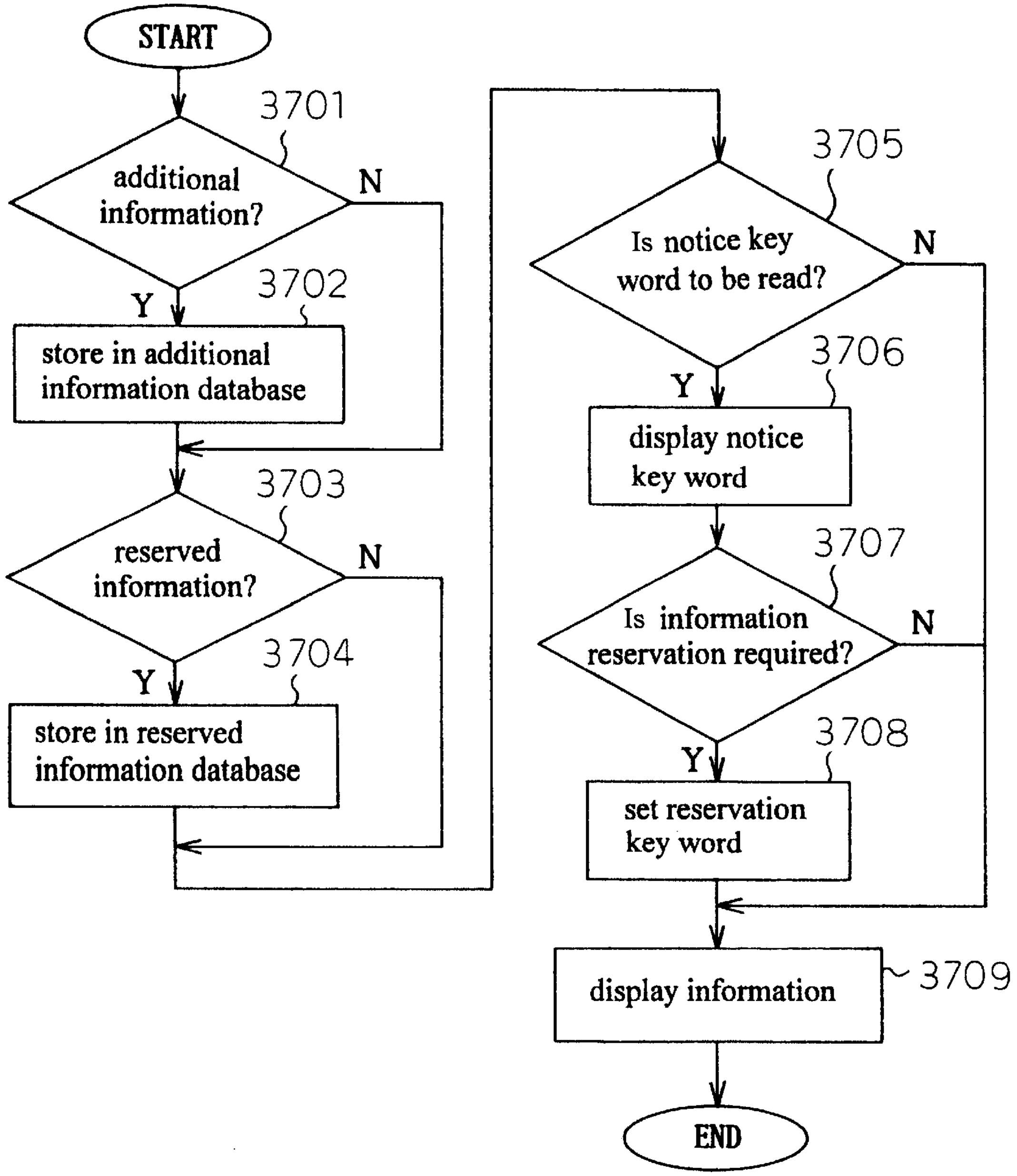
FIG. 37 is a flow chart showing an operational procedure of the thirteenth embodiment of the invention.

The operation of the information receiving apparatus having the above-described configuration will now be described with reference to the flow chart in FIG. 37.

Steps 3701 through 3703 perform the same operations as those at steps 1701 through 1703 of the fifth embodiment.

At step 3704, contents information received by the information receiving portion is stored in the reserved information database and, when the storage is complete, the display portion displays a message indicating that the reserved information has been stored. The display of the message may be accompanied by a sound.

When no power is supplied to the display portion, the message may be displayed when power is supplied to the display portion later. Further, such a message may be repeatedly displayed on a periodic basis until it is read.

Steps 3705 through 3709 perform the same operations as those at steps 1705 through 1709 of the fifth embodiment.

As described above, the information to be saved is selected and stored using notice key words, and a message is displayed when the information has been stored.

Although satellite digital broadcasting is used as communication means in the thirteenth embodiment, a public switched telephone network, CATV network or surface wave broadcasting may be used instead. The information receiving portion and the additional information receiving portion may use different means for communication. The information receiving portion and the additional information receiving portion may be provided as a single means instead of being separated from each other.

A fourteenth embodiment of the invention will now be described.

An information receiving apparatus utilizing satellite digital broadcasting will now be described as an embodiment of the invention.

Figure 38:
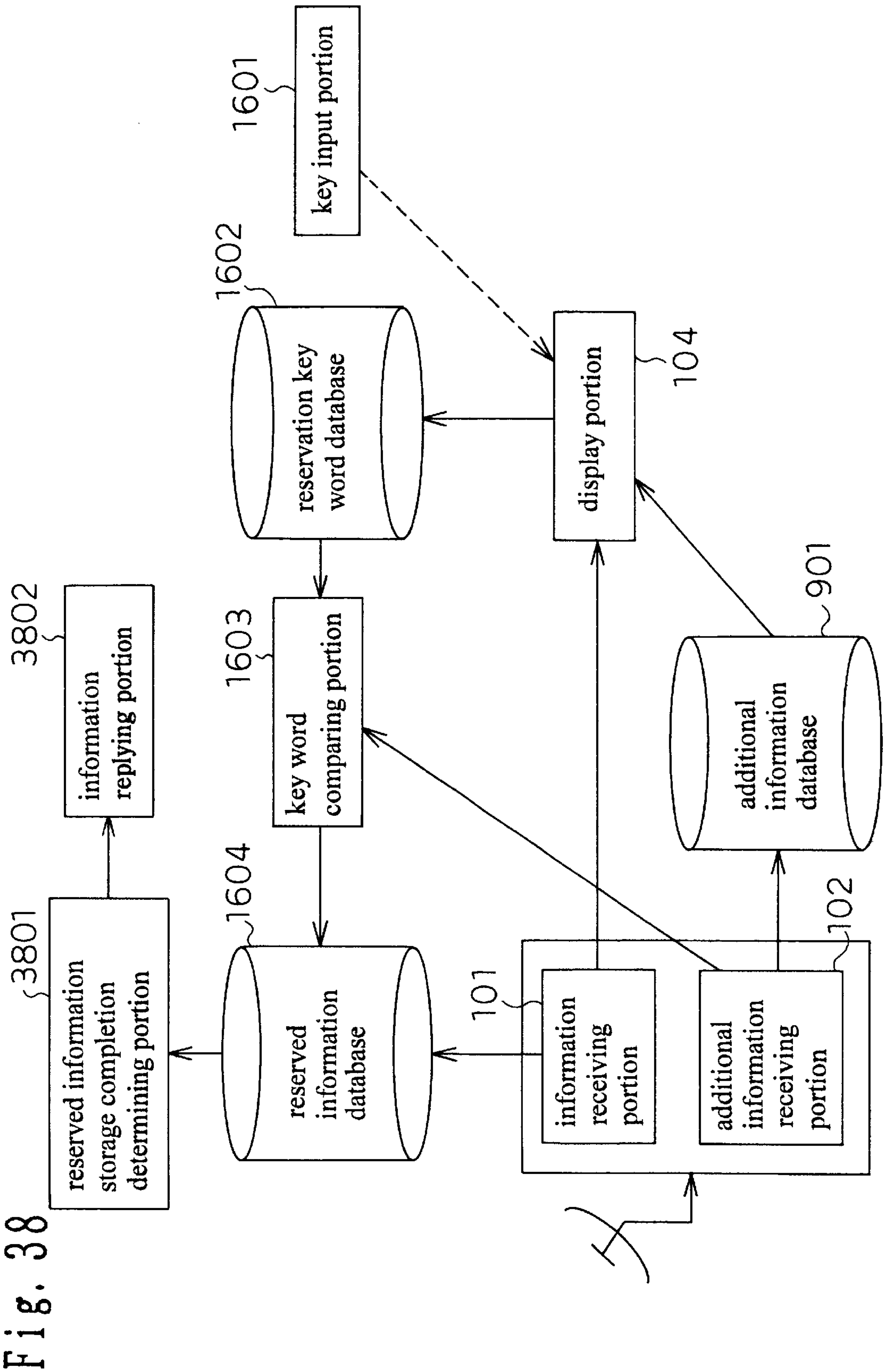
FIG. 38 is a system configuration diagram for a fourteenth embodiment of the invention.

FIG. 38 is a system configuration diagram according to the fourteenth embodiment of the invention. FIG. 38 includes the same parts as those in the system configuration for the fifth embodiment shown in FIG. 16. The following description will omit such parts which are indicated by like reference numbers and will be focused on only different parts.

In FIG. 38, a reference numeral 3801 designates a reserved information storage completion determining portion and a reference numeral 3802 designates an information replying portion. The reserved information storage completion determining portion 3801 and the information replying portion 3802 respectively correspond to reserved information storage completion determining means and information replying means in the context of the present invention.

Figure 39:
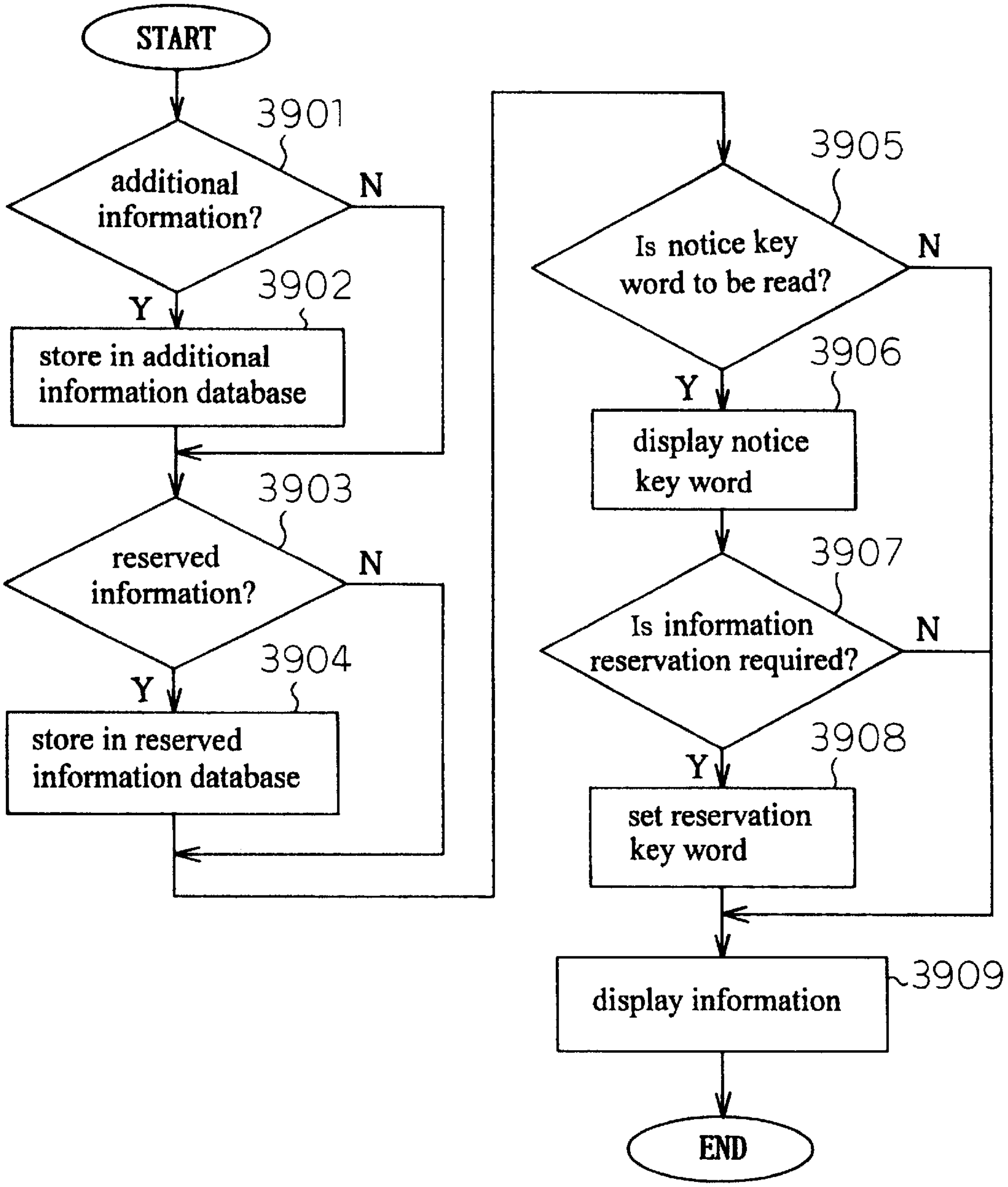
FIG. 39 is a flow chart showing an operational procedure of the fourteenth embodiment of the invention.

The operation of the information receiving apparatus having the above-described configuration will now be described with reference to the flow chart in FIG. 39.

Steps 3901 through 3903 perform the same operations as those at steps 1701 through 1703 of the fifth embodiment.

At step 3904, contents information received by the information receiving portion is stored in the reserved information database and, when the storage is complete, a message is replied to predetermined destinations to indicate that the contents information has been stored. The information replying portion 3802 performs this operation. This operation is advantageous for systems in which payment must be made for contents information and is charged when the storage is complete. The provider of information may be or may not be a destination of the replied information.

Steps 3905 through 3909 perform the same operations as those at steps 1705 through 1709 of the fifth embodiment.

As described above, information to be saved is selected and stored using notice key words, and a notification of the fact that the information has been stored is replied to certain destinations.

Although destinations to which such information is replied are determined in advance in the present embodiment, such destinations may be added to contents information. Further, information of such destinations may be associated with contents information in advance; such pieces of information may be transmitted as separate pieces of information at separate times; and the destinations may be added to the contents information based on such association after the information has been received.

Although satellite digital broadcasting is used as communication means in the fourteenth embodiment, a public switched telephone network, CATV network or surface wave broadcasting may be used instead. The information receiving portion and the additional information receiving portion may use different means for communication. The information receiving portion and the additional information receiving portion may be provided as a single means instead of being separated from each other.

A fifteenth embodiment of the invention will now be described.

An information receiving apparatus utilizing satellite digital broadcasting will now be described as an embodiment of the invention.

Figure 40:
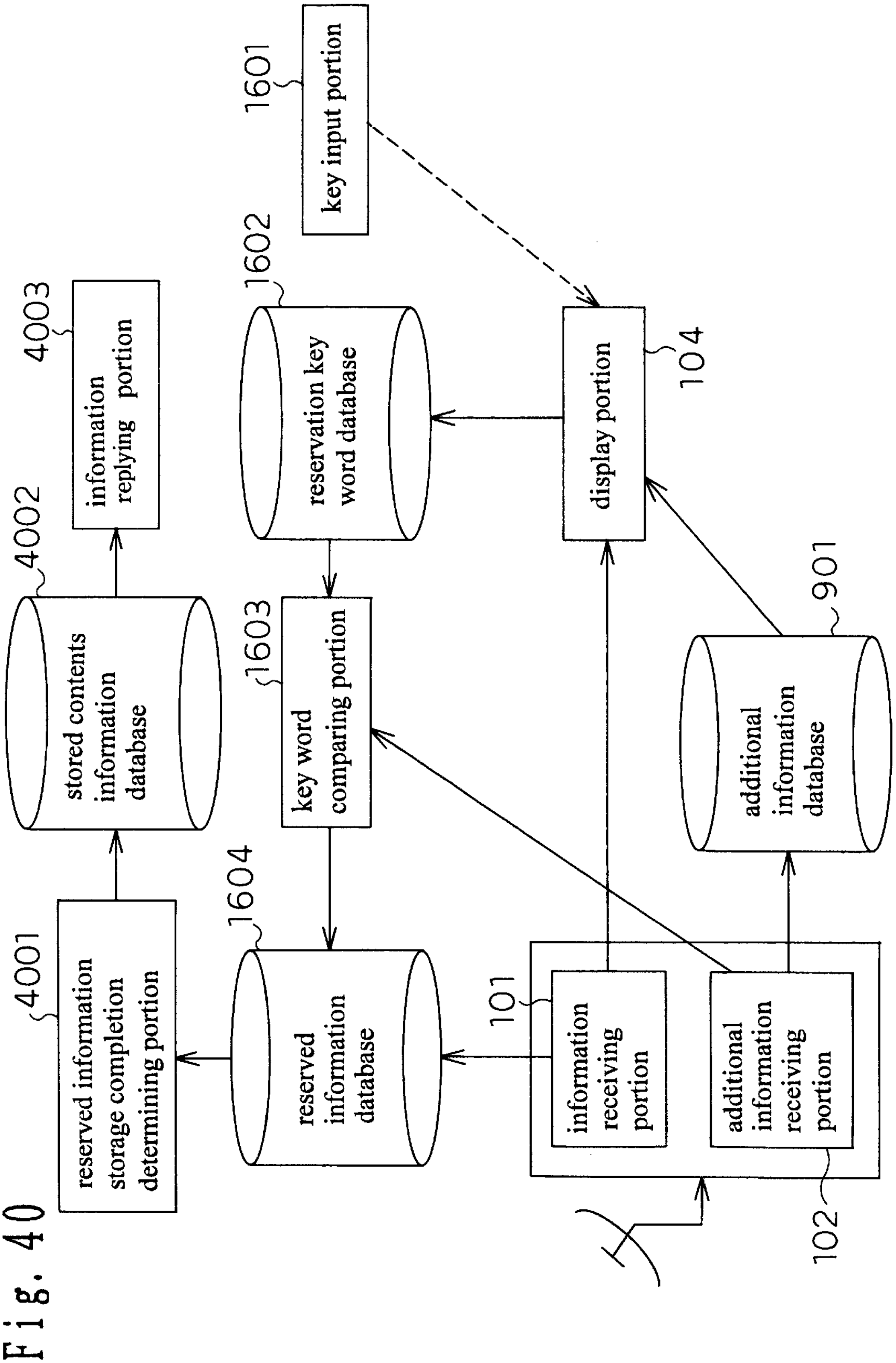
FIG. 40 is a system configuration diagram for a fifteenth embodiment of the invention.

FIG. 40 is a system configuration diagram according to the fifteenth embodiment of the invention. FIG. 40 includes the same parts as those in the system configuration for the fifth embodiment shown in FIG. 16. The following description will omit such parts which are indicated by like reference numbers and will be focused on only different parts.

In FIG. 40, a reference numeral 4001 designates a reserved information storage completion determining portion; a reference numeral 4002 designates an stored contents information database; and a reference numeral 4003 designates an information replying portion. The reserved information storage completion determining portion 4001, the stored contents information database 4002 and the information replying portion 4003 respectively correspond to reserved information storage completion determining means, stored contents information storing means and information replying means in the context of the present invention.

Figure 41:
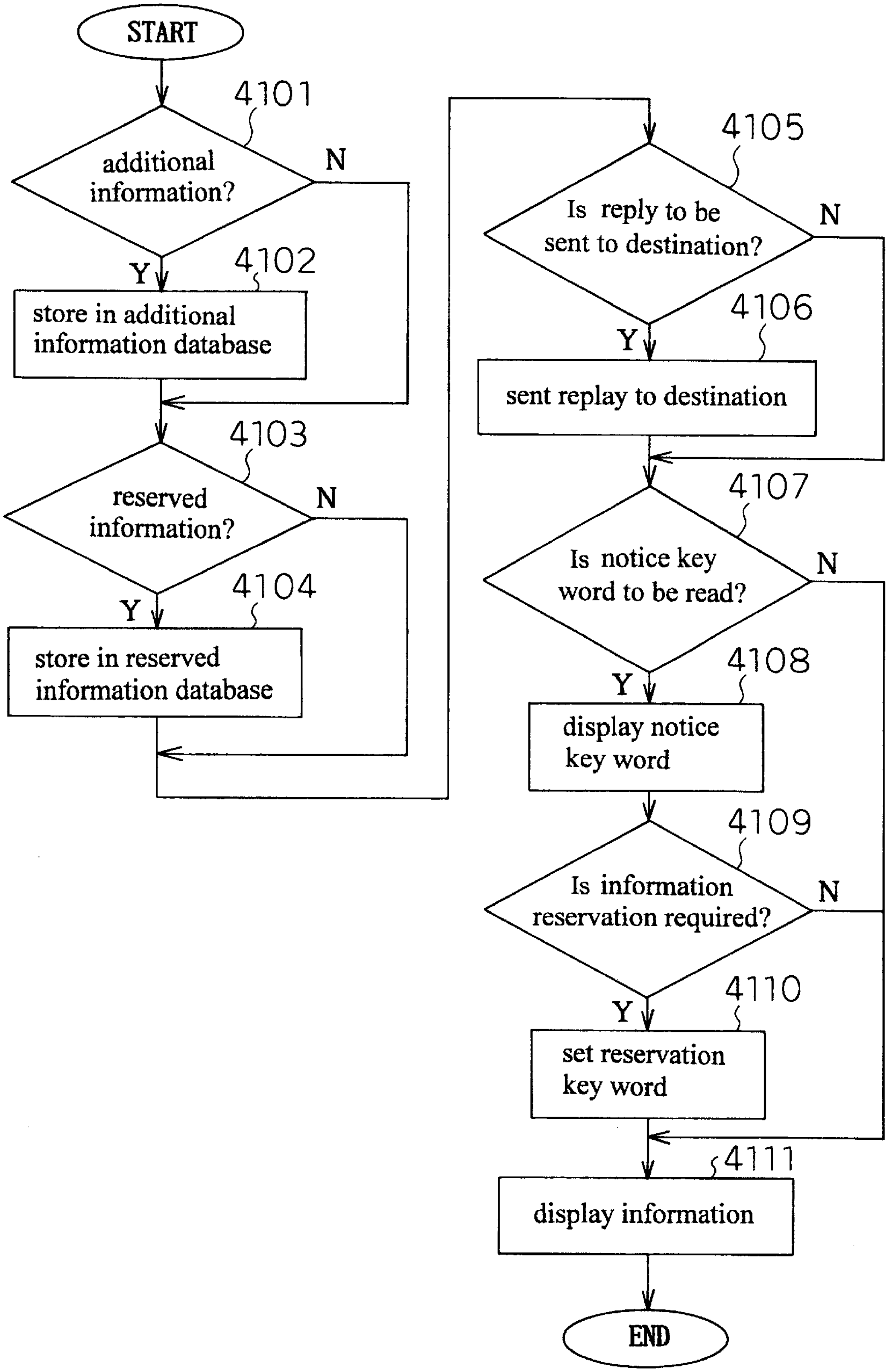
FIG. 41 is a flow chart showing an operational procedure of the fifteenth embodiment of the invention.

The operation of the information receiving apparatus having the above-described configuration will now be described with reference to the flow chart in FIG. 41.

Steps 4101 through 4103 perform the same operations as those at steps 1701 through 1703 of the fifth embodiment.

At step 4104, contents information received by the information receiving portion is stored in the reserved information database, and the content key word for the contents information for which storage has been complete is stored in the stored contents information database.

It is determined at step 4105 whether the information stored in the stored contents information database is to be replied to certain destinations. For example, this determination is made based on whether a piece of contents information which has been stored is to be charged or not. A broadcasting station or credit card company does not need information on whether toll-free contents information has been stored or not. In such a case, there is no need for replying such information. Further, such a determination is made by the information replying portion 4003.

The information is replied to its destinations at once at a predetermined point in time for replying. In order for this, the current point in time acquired by the clock is compared with the replying point in time. If they agree with each other, the process proceeds to step 4106 and, if not, the process proceeds to step 4107.

At step 4106, the information stored in the stored contents information database is replied to certain destinations. This operation is advantageous for systems in which payment must be made for contents information and is charged when the storage is completed in that communication cost can be saved because the reply information is not sent each time storage is completed. The provider of information may be or may not be a destination of the replied information.

Steps 4107 through 4111 perform the same operations as those at steps 1705 through 1709 of the fifth embodiment.

As described above, information to be saved is selected and stored using notice key words, and a notification of the fact that the information has been stored is periodically replied to certain destinations at once.

Although the destinations to which such information is replied are determined in advance in the present embodiment, such destinations may be added to contents information. Further, information of such destinations may be associated with contents information in advance; such pieces of information may be transmitted as separate pieces of information at separate times; and the destinations may be added to the contents information based on such association after the information is received.

Although satellite digital broadcasting is used as communication means in the fifteenth embodiment, a public switched telephone network, CATV network or surface wave broadcasting may be used instead. The information receiving portion and the additional information receiving portion may use different means for communication. The information receiving portion and the additional information receiving portion may be provided as a single means instead of being separated from each other.

As described above, the present embodiment relates to the receiving apparatuses such as television receivers and set top boxes and methods for reception in which information and key words for information scheduled for the next transmission are received from an information transmitting apparatus using a digital broadcasting system or a public switched telephone network and in which information to be saved is determined and stored by looking at the contents of the key word for the next transmission.

Each element in all of the above-described embodiments may be implemented in software or in dedicated hardware.

Obviously the operation of each means described in any of the above embodiments can be carried out by preparing and using a recording medium on which a program to cause a computer to execute all or part of each step is recorded.

The information receiving apparatus may be manufactured as a stand-alone unit which is connected to a monitor, a speaker and the like. Alternatively, it may be configured to be integrated with a television set, a facsimile machine, a personal computer or the like. When integrated, the program used in the implementation using software may be recorded in an information storage such as a hard disk or a semiconductor memory.

The program itself may be transmitted over a communication network such as the Internet to enhance an existing personal computer or television such that it can embody the present invention.

A notice key word and a key word used as a content key word may be a combination of a plurality of key words.

Further, while a notice key word has been described as being added to contents information, contents information and a notice key word may be associated with each other in advance; such pieces of information may be transmitted as separate pieces of information at different times; and the notice key word may be added to the contents information based on such association after the information has been While a notice key word and a content key word have been described as being added to contents information, contents information and a notice key word and a content key word may be associated with each other in advance; such pieces of information may be transmitted as separate pieces of information at different times; and the notice key word and the content key word may be added to the contents information based on such association after the information has been received.

While the expiration date of a notice key word have been described as being added to the notice key word, the notice key word and the expiration date of the notice key word may be associated with each other in advance; such pieces of information may be transmitted as separate pieces of information at different times; and the expiration date of the notice key word may be added to the notice key word based on such association after the information has been received.

While a notice key word and a reception period have been described as being added to contents information, the notice key word, the reception period and the contents information may be associated with each other in advance; such pieces of information may be transmitted as separate pieces of information at different times; and the notice key word and the reception period may be added to the contents information based on such association after the information has been received.

As described above, an information receiving apparatus according to the present invention receives a key word for the next transmission representing the contents of information scheduled for the next transmission to be able to check the contents of the information scheduled for the next transmission when received information is read.

Further, the classification item to which information belongs, the expiration date of the key word for the next transmission and the current key word are included in additional information to make it possible to check the contents of information to be transmitted next for each classification item, to disable the display of additional information whose expiration date has expired and to select, store, display and read information on the next key word.

The scheduled date and time and reception period of the next transmission are included in additional information. This makes it possible to supply power to the information receiving means or both of the information receiving means and additional information receiving means only during the reception period from the scheduled date and time for the next transmission of specified information and not to supply power in other period, thereby reducing the amount of power required for receiving information.

By receiving the key word for the next transmission added to particular contents information which is received without fail, the content of the next scheduled transmission can be checked reliably.

The frequencies of notice key words which have been specified for reservation are stored for each of the classification items to which the notice key words belong. This makes it possible to select and display the order in which the notice key words and candidate for deletion are displayed.

Moreover, it is possible to display a message or reply information when storage of contents information specified for reservation has been completed.

It is apparent from above that the present invention advantageously makes it possible to know the contents of information scheduled to be transmitted with a time delay from information in an amount smaller than that in the conventional art.

The present invention has another advantage in that it makes it possible to suppress power consumption below that achievable in the conventional art.

What is claimed is:

1. An apparatus for receiving information, wherein contents information including at least any of images, speech, text and data is transmitted along with a key word representing the contents of related information scheduled to be transmitted at a time delay as a notice key word and along with the arrival time of said related information and time required for receiving the same as a reception period, said apparatus comprising:

information receiving means for receiving said contents information;

additional information receiving means for receiving said notice key word and said reception period;

reception period receiving means for receiving said reception period;

power supply means for controlling the supply of power to at least one means including at least said information receiving means;

current time acquiring means for outputting the current time;

notice key word display means for displaying said notice key word; and reservation designating means for allowing a user to designate received information based on said displayed notice key word, wherein said power supply means is controlled to select and store contents information received by said receiving means based on notice key word designated for reservation by said reservation designating means along with the reception period received by said reception period receiving means and the current time output by said current time acquiring means.

2. An apparatus for receiving information according to claim 1, wherein said reception period includes the arrival time of information and the time at which reception is terminated.

3. An apparatus for receiving information according to claim 1, wherein after receiving transmission of information in which said contents information, said notice key word and an expiration date are associated with each other in advance and those pieces of information are transmitted as separate pieces of information at different times, said contents information, said notice key word and said expiration date are added based on said association.

4. An apparatus for receiving information, wherein contents information including at least any of images, speech, text and data is transmitted such that at least one piece of said contents information periodically transmitted for a predetermined time is added with a key word for related information scheduled to be transmitted at a time delay as a notice key word and added with the time required for receiving said related information as a reception period, said apparatus comprising:

information receiving means for receiving said contents information;

additional information receiving means for receiving said notice key word;

reception period receiving means for receiving said reception period;

power supply means for controlling the supply of power to one or more means including at least said information receiving means;

synchronous power supply control means for controlling said power supply means in synchronism with time at which said particular contents information is transmitted;

current time acquiring means for outputting the current time;

notice key word display means for displaying said notice key word; and reservation designating means for allowing a user to designate received information based on said displayed notice key word, wherein said power supply means is controlled to select and store said contents information received by said receiving means based on said reception period received by said reception period receiving means along with said notice key word designated for reservation by said reservation designating means and the current time output by said current time acquiring means.

5. An apparatus for receiving information according to claim 3 wherein said reception period includes the arrival time of information and the time at which reception is terminated.

* * * * *